US012300181B2

(12) United States Patent
Yuan et al.

(10) Patent No.: US 12,300,181 B2
(45) Date of Patent: May 13, 2025

(54) DISPLAY SUBSTRATE AND DRIVING METHOD THEREOF WITH MULTIPLEX CIRCUIT FOR START SIGNAL, AND DISPLAY DEVICE

(71) Applicants: Hefei BOE Joint Technology Co., Ltd., Anhui (CN); BOE TECHNOLOGY GROUP CO., LTD., Beijing (CN)

(72) Inventors: Zhidong Yuan, Beijing (CN); Yongqian Li, Beijing (CN); Can Yuan, Beijing (CN)

(73) Assignees: HEFEI BOE JOINT TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/261,113

(22) PCT Filed: May 24, 2022

(86) PCT No.: PCT/CN2022/094750
§ 371 (c)(1),
(2) Date: Jul. 12, 2023

(87) PCT Pub. No.: WO2023/225861
PCT Pub. Date: Nov. 30, 2023

(65) Prior Publication Data
US 2024/0404476 A1 Dec. 5, 2024

(51) Int. Cl.
*G09G 3/32* (2016.01)
*G09G 3/3225* (2016.01)
*G09G 3/3266* (2016.01)

(52) U.S. Cl.
CPC ......... *G09G 3/3266* (2013.01); *G09G 3/3225* (2013.01); *G09G 2300/0819* (2013.01);
(Continued)

(58) Field of Classification Search
CPC ....... G09G 2310/08; G09G 2310/0286; G09G 2300/0861; G09G 2300/0842; G09G 2300/0816; G09G 3/3266; G09G 3/3225
See application file for complete search history.

(56) References Cited

U.S. PATENT DOCUMENTS

2014/0160182 A1 6/2014 Hong et al.
2015/0154902 A1 6/2015 Lee et al.
(Continued)

FOREIGN PATENT DOCUMENTS

CN 104700765 A 6/2015
CN 105047122 A 11/2015
(Continued)

*Primary Examiner* — Liliana Cerullo
(74) *Attorney, Agent, or Firm* — XSENSUS LLP

(57) ABSTRACT

A display substrate includes N groups of gate driving circuits and a multiplex circuit. Each group of gate driving circuits includes X gate driving circuits, and each gate driving circuit is electrically connected to rows of pixel circuits in a corresponding display zone. The X gate driving circuits are configured to output X scan signals of different functions to the rows of pixel circuits connected thereto. The multiplex circuit is electrically connected to N gate driving circuits of the N groups of gate driving circuits outputting scan signals of the same function, N selection control signal terminals and a start signal terminal. The multiplex circuit is configured to, under at least one selection control signal from at least one selection control signal terminal, select at least one group of gate driving circuits, and transmit a start signal from the start signal terminal to each selected group of gate driving circuits.

20 Claims, 11 Drawing Sheets

(52) U.S. Cl.
CPC ............... *G09G 2300/0842* (2013.01); *G09G 2300/0861* (2013.01); *G09G 2310/0286* (2013.01); *G09G 2310/08* (2013.01)

(56) References Cited

U.S. PATENT DOCUMENTS

| | | | | |
|---|---|---|---|---|
| 2015/0356934 | A1* | 12/2015 | Yamashita | G09G 3/3611 345/99 |
| 2016/0148556 | A1 | 5/2016 | Tseng et al. | |
| 2017/0069280 | A1 | 3/2017 | Xu et al. | |
| 2019/0279574 | A1* | 9/2019 | Kim | G09G 3/3266 |
| 2020/0051479 | A1 | 2/2020 | Lee et al. | |
| 2022/0122546 | A1 | 4/2022 | Long et al. | |
| 2022/0351666 | A1* | 11/2022 | Dong | G09G 3/20 |
| 2023/0027673 | A1* | 1/2023 | Jeong | G09G 3/3266 |
| 2023/0079091 | A1 | 3/2023 | Yuan et al. | |

FOREIGN PATENT DOCUMENTS

| | | | |
|---|---|---|---|
| CN | 108231029 | A | 6/2018 |
| CN | 103871346 | B | 6/2019 |
| CN | 110246448 | A | 9/2019 |
| CN | 110706639 | A | 1/2020 |
| CN | 112201198 | A | 1/2021 |
| WO | 2021000233 | A1 | 1/2021 |

* cited by examiner

DISPLAY SUBSTRATE AND DRIVING METHOD THEREOF WITH MULTIPLEX CIRCUIT FOR START SIGNAL, AND DISPLAY DEVICE

CROSS-REFERENCE TO RELATED APPLICATION

This application is a national phase entry under 35 USC 371 of International Patent Application No. PCT/CN2022/094750, filed on May 24, 2022, which is incorporated herein by reference in its entirety.

TECHNICAL FIELD

The present disclosure relates to the field of display technologies, and in particular, to a display substrate and a driving method of a display substrate, and a display device.

BACKGROUND

Organic light-emitting diode (OLED) display devices provide images by exciting a spectrum of various wavelengths through direct recombination of electrons and holes. The OLED display devices have attracted much attention due to their advantages of active light-emitting, wide viewing angle, high contrast, fast response speed, low power consumption, light weight and small thickness.

SUMMARY

In an aspect, a display substrate is provided. The display substrate has a display region, and the display region includes N display zones, N being greater than or equal to 2 (N≥2). The display substrate includes a plurality of pixel circuits, N groups of gate driving circuits and at least one multiplex circuit. The plurality of pixel circuits are arranged in rows, and each display zone is provided therein with a plurality of rows of pixel circuits. The N groups of gate driving circuits correspond to the N display zones, respectively. Each group of gate driving circuits includes X gate driving circuits, and each gate driving circuit is electrically connected to a plurality of rows of pixel circuits in a corresponding display zone. The X gate driving circuits are configured to output X scan signals of different functions to a plurality of rows of pixel circuits connected thereto, X being greater than or equal to 2. Each multiplex circuit is electrically connected to N gate driving circuits, configured to output scan signals of the same function, of the N groups of gate driving circuits, and is further electrically connected to N selection control signal terminals and a start signal terminal. The multiplex circuit is configured to, under at least one selection control signal from at least one of the N selection control signal terminals, select at least one of the N gate driving circuits connected thereto, and transmit a start signal from the start signal terminal to the selected at least one gate driving circuit.

In some embodiments, the multiplex circuit includes N start signal control sub-circuits. Each start signal control sub-circuit is electrically connected to the start signal terminal, one of the N selection control signal terminals, and one of the N gate driving circuits. The start signal control sub-circuit is configured to transmit the start signal to the single gate driving circuit under control of a selection control signal from the signal selection control signal terminal. Among the N start signal control sub-circuits, different start signal control sub-circuits are electrically connected to different selection control signal terminals, and gate driving circuits, which are configured to output scan signals of the same function, of different groups of gate driving circuits.

In some embodiments, the multiplex circuit further includes N turn-off signal control sub-circuits. Each turn-off signal control sub-circuit is electrically connected to a first clock signal terminal, a first voltage signal terminal, and one of the N gate driving circuits. The turn-off signal control sub-circuit is configured to transmit a first voltage signal from the first voltage signal terminal to the one of the N gate driving circuits under control of a first clock signal from the first clock signal terminal. The N turn-off signal control sub-circuits are electrically connected to the same first clock signal terminal, and different turn-off signal control sub-circuits are electrically connected to gate driving circuits, which are configured to output scan signals of the same function, of different groups of gate driving circuits.

In some embodiments, the multiplex circuit further includes N storage sub-circuits. Each storage sub-circuit is electrically connected to the first voltage signal terminal and a signal output node, and is configured to maintain a voltage of the signal output node. The signal output node is a common node to which a start signal control sub-circuit, a turn-off signal control sub-circuit, and a gate driving circuit are connected. Among the N storage sub-circuits, different storage sub-circuits are electrically connected to different signal output nodes.

In some embodiments, the start signal control sub-circuit includes a first transistor, a control electrode of the first transistor is electrically connected to the single selection control signal terminal, a first electrode of the first transistor is electrically connected to the start signal terminal, and a second electrode of the first transistor is electrically connected to the single gate driving circuit. The turn-off signal control sub-circuit includes a second transistor, a control electrode of the second transistor is electrically connected to the first clock signal terminal, a first electrode of the second transistor is electrically connected to the first voltage signal terminal, and a second electrode of the second transistor is electrically connected to the one of the N gate driving circuits. The storage sub-circuit includes a first capacitor, a first electrode plate of the first capacitor is electrically connected to the first voltage signal terminal, and a second electrode plate of the first capacitor is electrically connected to the signal output node.

In some embodiments, the display substrate includes X multiplex circuits, and the X multiplex circuits are respectively electrically connected to X start signal terminals, and are respectively electrically connected to the X gate driving circuits of each group of gate driving circuits.

In some embodiments, the display substrate further includes a plurality of pins, N selection control signal lines, and X start signal connection lines. The plurality of pins are configured to electrically connect to a timing control chip. Each selection control signal line is electrically connected to one pin and the X multiplex circuits, and each selection control signal line is used as one selection control signal terminal. Each start signal connection line is electrically connected to one pin and one multiplex circuit, and each start signal connection line is used as one start signal terminal. In a case where the multiplex circuit includes N start signal control sub-circuits, X start signal control sub-circuits, which are electrically connected to a same selection control signal line, of the X multiplex circuits are electrically connected to X gate driving circuits of a same group of gate driving circuits, and different start signal control sub-circuits of the X multiples circuits are electrically connected to different gate driving circuits.

In some embodiments, the display substrate further includes a first clock signal line. The first clock signal line is used as a first clock signal terminal. The first clock signal line is electrically connected to one pin and the X multiplex circuits. In a case where in a case where the multiplex circuit includes N turn-off signal control sub-circuits, the first clock signal line is electrically connected to N turn-off signal control sub-circuits of each of the X multiplex circuits.

In some embodiments, the display substrate further includes a plurality of first scan signal lines, and each first scan signal line is electrically connected to a row of pixel circuits. Each pixel circuit includes a data writing transistor electrically connected to a first scan signal line and configured to write grayscale data into the pixel circuit under control of a first scan signal from the first scan signal line. The X gate driving circuits of each group of gate driving circuits include a first gate driving circuit configured to output first scan signals to first scan signal lines.

The at least one multiplex circuit includes a first multiplex circuit, and the first multiplex circuit is electrically connected to a first start signal terminal, the N selection control signal terminals, and N first gate driving circuits of the N groups of gate driving circuits. The first multiplex circuit is configured to, under control of the at least one selection control signal of the at least one selection control signal terminal of the N selection control signal terminals, select at least one first gate driving circuit of the N first gate driving circuits, and transmit a first start signal from the first start signal terminal to the selected at least one first gate driving circuit.

In some embodiments, the display substrate includes a plurality of multiplex circuits, the plurality of multiplex circuits further include a second multiplex circuit. The second multiplex circuit is electrically connected to an initialization signal terminal, the N selection control signal terminals, and the N first gate driving circuits of the N groups of gate driving circuits. The second multiplex circuit is configured to, under control of the at least one selection control signal of the at least one selection control signal terminal of the N selection control signal terminals, select the at least one first gate driving circuit of the N first gate driving circuits, and transmit an initialization signal from the initialization signal terminal to the selected at least one first gate driving circuit.

The first gate driving circuit includes a plurality of first shift register units that are sequentially connected in cascade; the second multiplex circuit is electrically connected to each first shift register unit of each first gate driving circuit; and the first shift register unit is configured to initialize a circuit node of the first shift register unit under control of the initialization signal from the second multiplex circuit.

In some embodiments, the first shift register unit includes a cascade signal output node and a reset signal receiving terminal. For two first shift register units that are connected in cascade, a cascade signal output node of a previous-stage first shift register unit is electrically connected to a first start signal receiving terminal of a current-stage first shift register unit, and a cascade signal output node of the current-stage first shift register unit is electrically connected to a reset signal receiving terminal of the previous-stage first shift register unit.

A signal output node, which is connected to each first gate driving circuit, of the second multiplex circuit is further electrically connected to a reset signal receiving terminal of a last-stage first shift register unit of each first gate driving circuit. Under control of a selection control signal from a same selection control signal terminal, the first multiplex circuit transmits the first start signal to a first gate driving circuit of a target group of gate driving circuits, and the second multiplex sub-circuit transmits the initialization signal to a first gate driving circuit of a previous group of gate driving circuits. In a scan direction of the display region, the previous group of gate driving circuits is adjacent to the target group of gate driving circuits. In a case where the target group of gate driving circuits is a first group of gate driving circuits, the previous group of gate driving circuits is a last group of gate driving circuits.

In some embodiments, the display substrate further includes a plurality of second scan signal lines, and a single second scan signal line is electrically connected to a row of the pixel circuits. Each pixel circuit further includes a first initialization transistor; the first initialization transistor is electrically connected to a second scan signal line, and is configured to initialize a voltage of a first node of the pixel circuit under control of a second scan signal from the second scan signal line. The X gate driving circuits include a second gate driving circuit, and the second gate driving circuit is configured to output second scan signals to second scan signal lines.

The display substrate includes a plurality of multiplex circuits, and the plurality of multiplex circuits further include a third multiplex circuit. The third multiplex circuit is electrically connected to a second start signal terminal, the N selection control signal terminals, and N second gate driving circuits of the N groups of gate driving circuits. The third multiplex circuit is configured to, under control of the at least one selection control signal from the at least one of the N selection control signal terminals, select at least one second gate driving circuit of the N second gate driving circuits, and transmit a second start signal from the second start signal terminal to the selected at least one second gate driving circuit.

In some embodiments, the display substrate further includes a plurality of third scan signal lines, and a single third scan signal line is electrically connected to a row of the pixel circuits. Each pixel circuit further includes a second initialization transistor electrically connected to a third scan signal line and configured to reset a voltage of a second node of the pixel circuit under control of a third scan signal from the third scan signal line. The X gate driving circuits further include a third gate driving circuit configured to output third scan signals to third scan signal lines.

The display substrate includes a plurality of multiplex circuits, and the plurality of multiplex circuits further include a fourth multiplex circuit. The fourth multiplex circuit is electrically connected to a third start signal terminal, the N selection control signal terminals, and N third gate driving circuits of the N groups of gate driving circuits. The fourth multiplex circuit is configured to, under control of the at least one selection control signal from the at least one of the N selection control signal terminals, select at least one third gate driving circuit of the N third gate driving circuits, and transmit a third start signal from the third start signal terminal to the selected at least one third gate driving circuit.

In some embodiments, the display substrate further includes a plurality of fourth scan signal lines, and a single fourth scan signal line is electrically connected to a row of the pixel circuits. Each pixel circuit further includes a light-emitting control transistor electrically connected to a fourth scan signal line and configured to turn on the pixel circuit under control of a fourth scan signal from the fourth scan signal line. The X gate driving circuits further include a light-emitting control circuit configured to output fourth scan signals to fourth scan signal lines.

The display substrate includes a plurality of multiplex circuits, and the plurality of multiplex circuits further include a fifth multiplex circuit. The fifth multiplex circuit is electrically connected to a fourth start signal terminal, the N selection control signal terminals, and N light-emitting control circuits of the N groups of gate driving circuits. The fifth multiplex circuit is configured to, under control of the at least one selection control signal from the at least one of the N selection control signal terminals, select at least one light-emitting control circuit of the N light-emitting control circuits, and transmit a fourth start signal from the fourth start signal terminal to the selected at least one light-emitting control circuit.

In some embodiments, the display substrate further has a peripheral region surrounding the display region. The peripheral region includes a bonding region located on a side of the display region in a scan direction of the display region. The multiplex circuit is disposed on a side, proximate to the bonding region, of the N groups of gate driving circuits.

In another aspect, a driving method of a display substrate is provided, the driving method is configured to the display substrate described in any one of the above embodiments. The driving method includes: the at least one selection control signal terminal of the N selection control signal terminals outputting the at least one selection control signal; and under the at least one selection control signal, the multiplex circuit selecting the at least one gate driving circuit of the N gate driving circuits connected thereto, and transmitting the start signal from the start signal terminal to the selected at least one gate driving circuit.

In some embodiments, the multiplex circuit includes N turn-off signal control sub-circuits. The driving method further includes: in a case where the at least one selection control signal terminal of the N selection control signal terminals outputs the selection control signal, a first clock signal terminal outputting no signal; and in a case where all the N selection control signal terminals output no selection control signal, the first clock signal terminal outputting a first clock signal.

In some embodiments, the display substrate includes a second multiplex circuit, a signal output node of the second multiplex circuit is electrically connected to a start signal receiving terminal of each first shift register unit of a first gate driving circuit and a reset signal receiving terminal of a last-stage first register unit of the first gate driving circuit. The driving method further includes: after a last-stage first register unit of a gate driving circuit outputs a first scan signal, a signal output node, electrically connected to the gate driving circuit, of the second multiplex circuit outputting an initialization signal.

In yet another aspect, a display device is provided. The display device includes the display substrate as described in any of the above embodiments.

BRIEF DESCRIPTION OF THE DRAWINGS

In order to describe technical solutions in the present disclosure more clearly, the accompanying drawings to be used in some embodiments of the present disclosure will be introduced briefly. However, the accompanying drawings to be described below are merely some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

DETAILED DESCRIPTION

Figure 1:
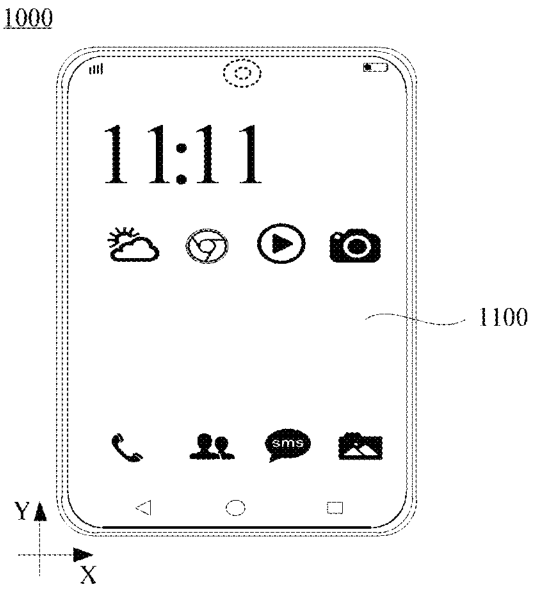
FIG. 1 is a structural diagram of a display device, in accordance with some embodiments.

The technical solutions in some embodiments of the present disclosure will be described clearly and completely with reference to the accompanying drawings. However, the described embodiments are merely some but not all of embodiments of the present disclosure. All other embodiments obtained by a person having ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed in an open and inclusive meaning, i.e., "including, but not limited to". In the description of the specification, the terms such as "one embodiment", "some embodiments", "exemplary embodiments", "example", "specific example"

or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are configured for descriptive purposes only, but are not to be construed as indicating or implying the relative importance or implicitly indicating the number of indicated technical features. Thus, features defined with the terms such as "first" and "second" may explicitly or implicitly include one or more of the features. In the description of the embodiments of the present disclosure, the terms "a plurality of", "the plurality of" and "multiple" each mean two or more unless otherwise specified.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

"A plurality of A correspond to a plurality of B, respectively" means that the number of A is equal to the number of B, and each A corresponds to a single B, and different A corresponds to different B.

The phrase "configured to" as used herein indicates an open and inclusive expression, which does not exclude devices that are configured to perform additional tasks or steps.

Exemplary embodiments are described herein with reference to segmental views and/or plan views as idealized exemplary drawings. In the accompanying drawings, thicknesses of layers and sizes of regions are enlarged for clarity. Variations in shapes with respect to the accompanying drawings due to, for example, manufacturing technologies and/or tolerances may be envisaged. Therefore, the exemplary embodiments should not be construed as being limited to the shapes of the regions shown herein, but including deviations in the shapes due to, for example, manufacturing.

For example, an etched region shown in a rectangular shape generally has a feature being curved. Therefore, the regions shown in the accompanying drawings are schematic in nature, and their shapes are not intended to show actual shapes of the regions in a device, and are not intended to limit the scope of the exemplary embodiments.

Transistors used in all the embodiments of the present disclosure may be thin film transistors (TFTs), field effect transistors (such as metal oxide semiconductor (MOS) field effect transistors), or other switching devices with the same properties, which will not be limited in the embodiments of the present disclosure.

For example, the transistors may be TFTs. The TFTs may be formed by using an a-Si process, an oxide semiconductor process, a low temperature poly-silicon (LTPS) process, or a high temperature poly-silicon (HTPS) process. The embodiments of the present disclosure do not limit thereto.

The type of the transistors is not limited in the embodiments of the present disclosure. In addition, the transistors may be N-type transistors or P-type transistors, or may be enhancement-mode transistors or depletion-mode transistors. In the embodiments of the present disclosure, the present disclosure is illustrated by taking an example in which all the transistors are N-type transistors. The N-type transistor is turned on (switched on) due to a high-level voltage signal, and is turned off (switched off) due to a low-level voltage signal. In the embodiments of the present disclosure, the "operating voltage" refers to a voltage capable of controlling the N-type transistors to be turned on, i.e., a high-level voltage, the "turn-off voltage" refers to a voltage capable of controlling the N-type transistors to be turned off, i.e., a low-level voltage.

In the embodiments of the present disclosure, a gate of the transistor is a control electrode, and in order to distinguish two electrodes of the transistor except the gate, one electrode of the two electrodes is directly described as a first electrode, and the other electrode is a second electrode. The first electrode of the transistor may be one of a source and a drain of the transistor, and the second electrode of the transistor may be the other of the source and the drain of the transistor. Since the source and the drain of the transistor may be symmetrical in structure, there may be no difference in structure between the source and the drain of the transistor.

Each transistor may further include at least one switching transistor connected in parallel with each transistor. The embodiments of the present disclosure are merely examples of the pixel circuit and the gate driving circuit. Other structures having the same functions as the pixel circuit and the gate driving circuit are not elaborated herein, but all shall be included in the protection scope of the present disclosure.

A capacitor in the embodiments of the present disclosure may be manufactured separately through a process. For example, the capacitor is realized by manufacturing special capacitor electrodes, and each of the capacitor electrodes (a first electrode plate and a second electrode plate) of the capacitor may be realized by a metal layer, a semiconductor layer (e.g., doped with polysilicon), or the like. The capacitor may also be a parasitic capacitor formed by transistors, or be achieved by a transistor itself and another device or line, or by a parasitic capacitor formed by lines of a circuit itself.

In the embodiments of the present disclosure, "first node", "second node", "signal output node" and other circuit nodes do not represent actual components, but rather represent junction points of related electrical connections in a circuit diagram. That is, these nodes are equivalent to the junction points of the relevant electrical connections in the circuit diagram.

Some embodiments of the present disclosure provide a display device 1000, referring to FIG. 1, FIG. 1 is a structural diagram of the display device 1000, the display device 1000 may be any device that displays an image whether in motion (e.g., a video) or stationary (e.g., a still image), and whether textual or graphical.

For example, the display device 1000 may be any product or component having a display function, such as a television, a notebook computer, a tablet computer, a mobile phone, a personal digital assistant (PDA), a navigator, a wearable device, an augmented reality (AR) device, a virtual reality (VR) device, etc.

The display device 1000 may be an electroluminescent display device or a photoluminescent display device. In a case where the display device 1000 is the electroluminescent display device, the electroluminescent display device may be an organic light-emitting diode (OLED) display device or a quantum dot light-emitting diode (QLED) display device. In a case where the display device is the photoluminescent display device, the photoluminescent display device may be a quantum dot photoluminescent display device. For example, the present disclosure will be described by taking an example in which the display device 1000 in the embodiments of the present disclosure is the OLED display device.

Figure 2:
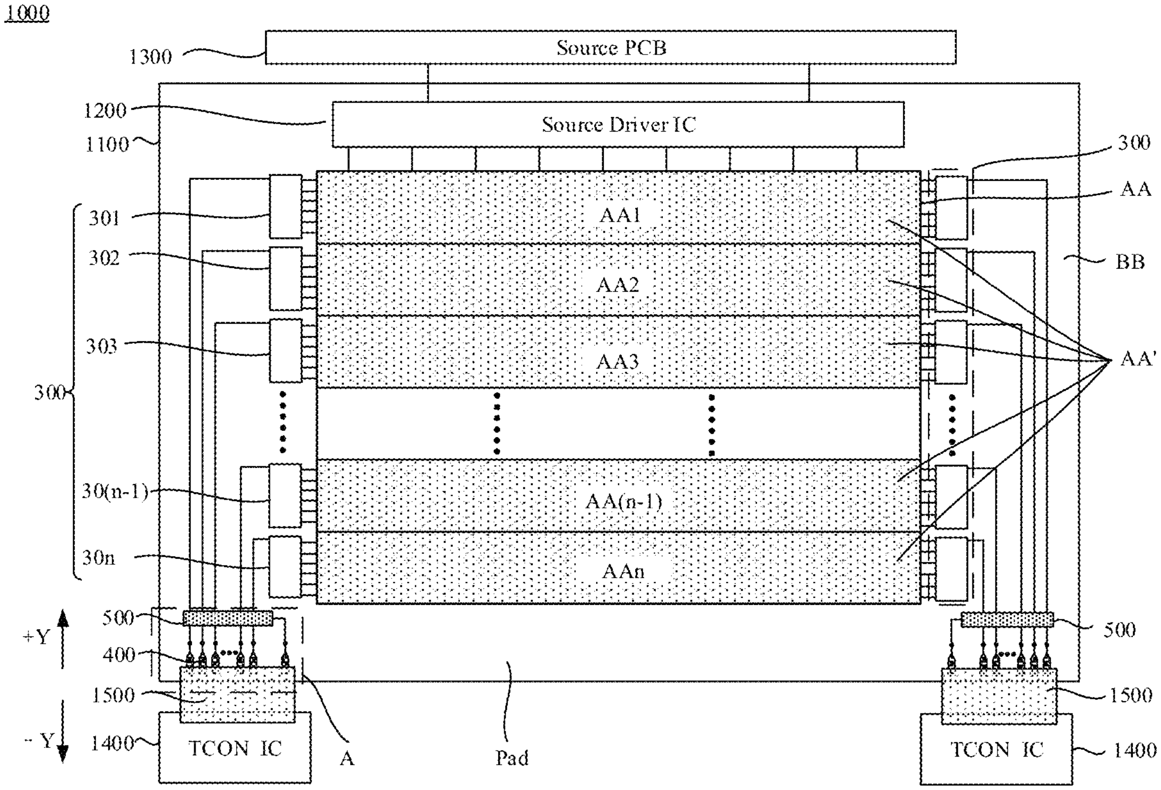
FIG. 2 is a structural diagram of another display device, in accordance with some embodiments.

In some embodiments, referring to FIG. 2, the display device 1000 may include a display substrate 1100, a data driving circuit 1200 disposed on the display substrate 1100, a circuit board 1300 electrically connected to the data driving circuit 1200, a timing controller 1400 (which may also be referred to as a logic board, a panel driving board, or a central control board, etc.), and a chip-on-film (COF) 1500 configured to electrically connect the timing controller 1400 and the display substrate 1100. For example, the data driving circuit 1200 may be a driving chip (a source driver integrated circuit (IC)), the circuit board 1300 may be a driving circuit board (a source printed circuit board (PCB)), and the timing controller 1400 may be a timing control chip (a timing controller (TCON) IC). The circuit board 1300 is electrically connected to the data driving circuit 1200.

In some embodiments, referring to FIG. 2, the display substrate 1100 has a display region AA and a peripheral region BB surrounding the display region AA. The peripheral region BB includes a bonding region Pad located on a side of the display region AA.

The display region AA may include N display zones AA', and each display zone AA' of the N display zones AA' may be independently controlled. In this way, the display device 1000 may perform partitioned display, and display contents in all the display zones AA' may the same or different. Here, N is a positive integer greater than or equal to 2.

For example, the N display zones AA' may be numbered sequentially along a scan direction −Y of the display region AA (which is simply referred to as the scan direction −Y below). For example, the N display zones AA' may be numbered sequentially as a first display zone AA1, a second display zone AA2, . . . , and an Nth display zone AAn. The scan direction −Y of the display region AA refers to a direction of scan signals scanning a plurality of rows of pixel circuits 100 line by line. For example, referring to FIG. 2, in each display zone AA', scan signals scan rows of pixel circuits 100 line by line from top to bottom, and the scan direction −Y of the display zone AA is a direction from top to bottom.

Each display zone AA of the N display zones AA' may be independently controlled. For example, only a part of the display zones AA of the display device 1000 may display images; for example, only a first display zone AA1 of the display device 1000 may display images. Alternatively, different display zones AA' may display images at different refresh frequencies; for example, in a part of the display zone AA (at least one display zone AA'), a high-frequency frame display may be performed (a refresh frequency is higher than that of other display zones AA'), that is, a partial high-frequency frame display may be performed. Alternatively, the N display zones AA may be sequentially turned on in a certain order, or at least two display zones AA' may be turned on at the same time (the at least two display zones AA' may display the same content). The embodiments of the present disclosure do not specifically limit the display manner and the turn-on sequence of all the display zones AA'.

Figure 3:
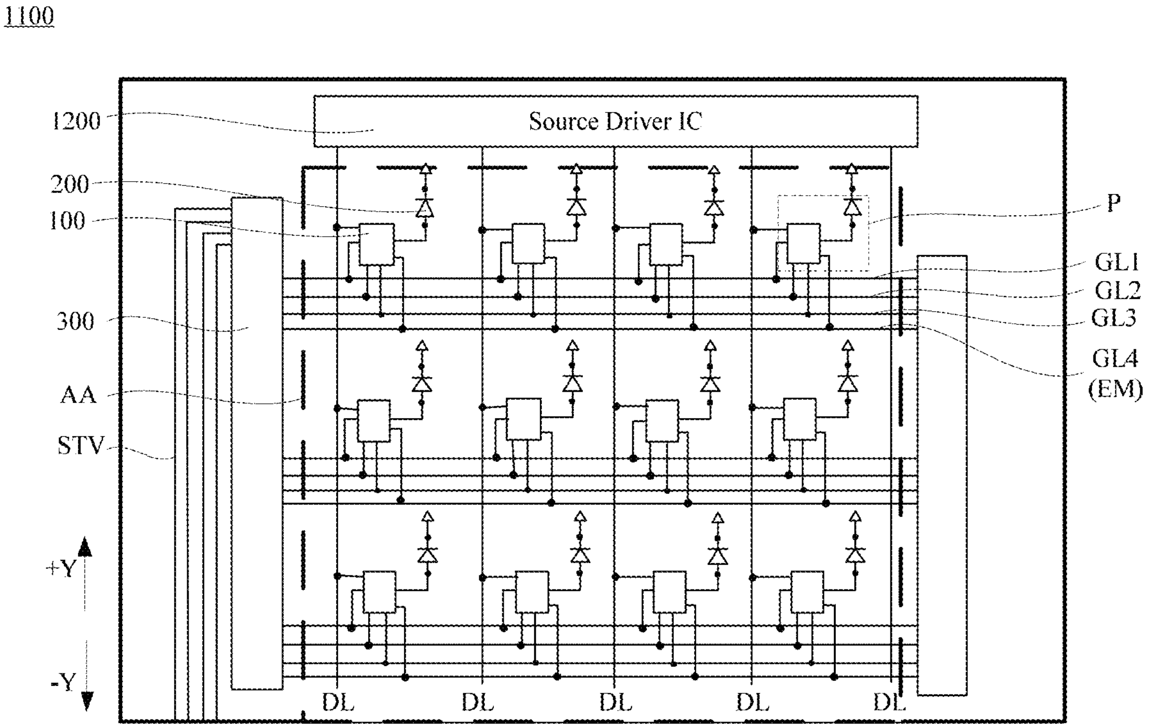
FIG. 3 is a structural diagram of a display substrate, in accordance with some embodiments.

Referring to FIG. 3, the display substrate 1100 includes a plurality of sub-pixels P, the plurality of sub-pixels P are disposed in the display region AA of the display substrate 1100, and each sub-pixel P includes a pixel circuit 100 and a light-emitting device 200. A plurality of pixel circuits 100 of the plurality of sub-pixels P are arranged in rows, and each display zone AA' is provided therein with a plurality of rows of pixel circuits 100. The plurality of sub-pixels P may include sub-pixels P that emit light of at least three primary colors (e.g., red (R), green (G), and blue (B)).

The pixel circuit 100 includes a plurality of transistors (e.g., TFTs) and at least one capacitor. For example, the pixel circuit 100 may be a "7T1C" circuit, a "7T2C" circuit, a "3T1C" circuit, a "5T1C" circuit, or the like; here, "T" refers to the TFT, a number in front of "T" refers to the number of TFTs, "C" refers to the capacitor Cst, and a number in front of "C" refers to the number of capacitors Cst.

It will be understood that the embodiments of the present disclosure do not specifically limit the specific structure of the pixel circuit 100, and in the following embodiments of the present disclosure, the present disclosure is illustrated by taking an example in which the pixel circuit is the "5T1C" circuit.

Figure 4:
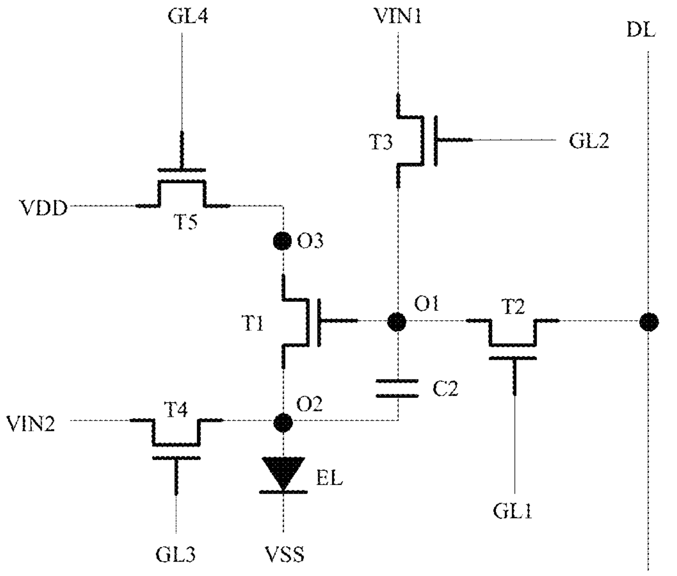
FIG. 4 is an equivalent circuit diagram of a pixel circuit, in accordance with some embodiments.

In a case where the pixel circuit 100 is the "5T1C" circuit, referring to FIG. 4, the pixel circuit 100 may include a driving transistor T1, a data writing transistor T2, a first initialization transistor T3, a second initialization transistor T4, a light-emitting control transistor T5, and a second capacitor C2.

Figure 5:
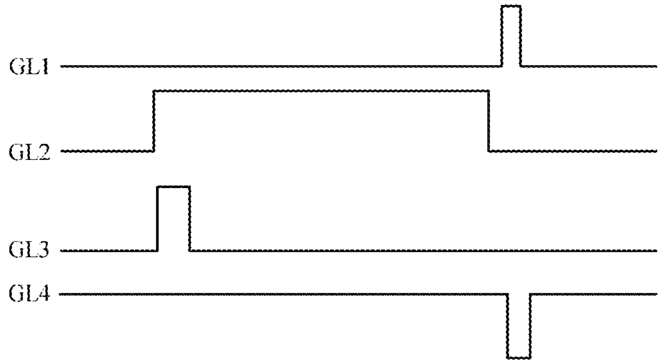
FIG. 5 is a timing control diagram of the pixel circuit shown in FIG. 4.

Referring to FIGS. 3, 4 and 5, the display substrate 1100 further includes a plurality of first scan signal lines GL1, a plurality of second scan signal lines GL2, a plurality of third scan signal lines GL3, a plurality of fourth scan signal lines GL4 (also referred to as light-emitting control lines EM), and a plurality of data lines DL. Each row of pixel circuits 100 is electrically connected to a single first scan signal line GL1, a single second scan signal line GL2, a single third scan signal line GL3, and a single fourth scan signal line GL4; and a column of pixel circuits 100 is electrically connected to one of the plurality of data lines DL.

A control electrode of the data writing transistor T2 is electrically connected to the first scan signal line GL1, a first electrode of the data writing transistor T2 is electrically connected to the data line DL, and a second electrode of the data writing transistor T2 is electrically connected to a first node O1. The data writing transistor T2 is configured to write grayscale data to the pixel circuit 100 (i.e., to transmit the grayscale data from the data line DL to the first node O1) under control of a first scan signal from the first scan signal line GL1.

A control electrode of the first initialization transistor T3 is electrically connected to the second scan signal line GL2, a first electrode of the first initialization transistor T3 is electrically connected to a first initialization signal line VIN1, a second electrode of the first initialization transistor T3 is electrically connected to the first node O1. The first initialization transistor T3 is configured to transmit a first initialization voltage signal from the first initialization signal line VIN1 to the first node O1 under control of a second scan signal from the second scan signal line GL2, so as to initialize a voltage of the first node O1.

A control electrode of the second initialization transistor T4 is electrically connected to the third scan signal line GL3, a first electrode of the second initialization transistor T4 is electrically connected to a second initialization signal line VIN2, and a second electrode of the second initialization transistor T4 is electrically connected to a second node O2. The second initialization transistor T4 is configured to transmit a second initialization voltage signal from the second initialization signal line VIN2 to the second node O2 under control of a third scan signal from the third scan signal line GL3, so as to initialize a voltage of the second node O2. The second initialization signal line VIN2 and the first initialization signal line VIN1 may be the same or different. For example, the second initialization signal line VIN2 and the first initialization signal line VIN1 are the same, and both continuously output low-level voltage signals.

A control electrode of the light-emitting control transistor T5 is electrically connected to the fourth scan signal line GL4, a first electrode of the light-emitting control transistor T5 is electrically connected to a power supply voltage signal terminal VDD, and a second electrode of the light-emitting control transistor T5 is electrically connected to a third node O3. The light-emitting control transistor T5 is configured to transmit a power supply voltage from the power supply voltage signal terminal VDD to the third node O3 under control of a fourth scan signal from the fourth scan signal line GL4.

A control electrode of the driving transistor T1 is electrically connected to the first node O1, a first electrode of the driving transistor T1 is electrically connected to the third node O3, and a second electrode of the driving transistor T1 is electrically connected to the second node O2 (an anode of the light-emitting device EL). The driving transistor T1 is configured to transmit a voltage of the third node O3 to the second node O2 under control of the voltage of the first node O1.

A first electrode plate of the second capacitor C2 is electrically connected to the first node O1, and a second electrode plate of the second capacitor C2 is electrically connected to the second node O2.

Referring to FIG. 2, the display substrate 1100 further includes N groups of gate driving circuits 300. The N groups of gate driving circuits 300 correspond to the N display zones AA', respectively. That is, the number of the N groups of gate driving circuits 300 is equal to the number of the N display zones AA', each group of gate driving circuits 300 corresponds to a single display zone AA', and different groups of gate driving circuits 300 correspond to different display zones AA'.

For example, the N groups of gate driving circuits 300 may be numbered sequentially in the scan direction −Y For example, the N groups of gate driving circuits 300 may be numbered sequentially as a first group of gate driving circuits 301, a second group of gate driving circuits 302, . . . , and an Nth group of gate driving circuits 30*n*.

For example, the first group of gate driving circuits 301 corresponds to the first display zone AA1, the second group of gate driving circuits 302 corresponds to the second display zone AA2, . . . , and the Nth group of gate driving circuits 30*n* corresponds to the Nth display zone AAn. That is, the N groups of gate driving circuits 300 correspond to the N display zones AA' one by one according to the numbering sequence.

Each group of gate driving circuits 310 is electrically connected to a plurality of rows of pixel circuits 100 in a corresponding display zone AA'. For example, the first group of gate driving circuits 301 is electrically connected to a plurality of rows of pixel circuits 100 in the first display zone AA1, the second group of gate driving circuits 302 is electrically connected to a plurality of rows of pixel circuits 100 in the second display zone AA2, . . . , and the Nth group of gate driving circuits 30*n* is electrically connected to a plurality of rows of pixel circuits 100 in the Nth display zone AAn.

Each group of gate driving circuits 300 includes X gate driving circuits 310, X being greater than or equal to 2 (X≥2). The X gate driving circuits 310 are configured to output X scan signals of different functions to rows of pixel circuits 100 connected thereto.

It should be noted that, in the embodiments of the present disclosure, in order to distinguish a group of gate driving circuits from a gate driving circuit, a number "300" is used when one or more groups of gate driving circuits are described, and a number "310" is used when one or more gate driving circuits are described.

For example, each gate driving circuit 310 outputs a scan signal, so as to turn on at least one transistor in a pixel circuit 100. Each gate driving circuit 310 may include a plurality of shift register units that are connected in cascade, and each shift register unit is electrically connected to a row of sub-pixels 100.

The X gate driving circuits 310 are configured to output the X scan signals of different functions, and the X scan signals of different functions are configured to turn on different transistors in the pixel circuits 100.

For example, in a case where the pixel circuit 100 is the "5T1C" circuit and the display substrate 1100 includes the first scan signal lines GL1, the second scan signal lines GL2, the third scan signal lines GL3, and the fourth scan signal lines GL4, referring to FIG. 5, the first scan signal lines GL1, the second scan signal lines GL2, the third scan signal lines GL3, and the fourth scan signal lines GL4 output different voltage signals (i.e., output scan signals of different functions) in different periods. In this way, each group of gate driving circuits 300 may include four gate driving circuits 310, the four gate driving circuits 310 are electrically connected to a first scan signal line GL1, a second scan signal line GL2, a third scan signal line GL3 and a fourth scan signal line GL4, respectively; and the four gate driving circuits 310 are configured to output a corresponding first scan signal to the first scan signal line GL1, a corresponding second scan signal to the second scan signal line GL2, a corresponding third scan signal to the third scan signal line GL3, and a corresponding fourth scan signal (a light-emitting control signal) to the fourth scan signal line GL4.

The N groups of gate driving circuits 300 include N×X gate driving circuits 310, and each gate driving circuit 310 needs to be electrically connected to a start signal terminal STV to receive a start signal, so that the gate driving circuit 310 is controlled to start to operate. In this way, the N gate driving circuits 300 require N×X start signals, so that the N×X gate driving circuits 310 of the N gate driving circuits 300 are controlled to start to operate.

The display substrate 1100 further includes a plurality of pins (also called gold fingers, pins, or pins) 400 and a plurality of start signal connection lines (not shown in figures). The plurality of pins 400 are disposed in the bonding region Pad, and the timing controller 1400 is electrically connected to at least part of the plurality of pins 400 through the COF 1500.

It will be understood that FIG. 2 is merely an example, in which gate driving circuits 300 are disposed on two sides of the display region AA of the display substrate 1100, the gate driving circuits 300 on the two sides may be symmetrically arranged, and sequentially drive the gate lines GL from the two sides row by row, i.e., adopts a double-sided driving manner; in the embodiments of the present disclosure, only N groups of gate driving circuits 300 on one side are described.

In some other embodiments, the display substrate 1100 may be provided with only a gate driving circuit 300 on a single side of the display region AA, i.e., adopts a single-sided driving manner. Alternatively, in some embodiments, the display substrate 1100 may be provided with gate driving circuits 300 on the two sides in the peripheral region BB, and the gate driving circuits 300 on the two sides alternately drive the gate lines GL row by row from the two sides.

In the related art, a display substrate includes N×X pins and N×X start signal connection lines, and each pin is electrically connected to a gate driving circuit through a start signal connection line. A timing controller outputs a start signal to a gate driving circuit through a pin and a start signal connection line. Thus, the display substrate requires a large number of pins and a large number of start signal connection lines, which is not conducive to the connection and fixation of the pins and the COF, and is not conducive to the routing arrangement of the display substrate. In addition, the timing controller needs a large number of control signals to be output, and the timing control is complex.

In order to solve the above technical problems, for the display substrate 100 provided in the embodiments of the present disclosure, referring to FIG. 2, the display substrate 100 further includes at least one multiplex circuit 500.

Figure 6:
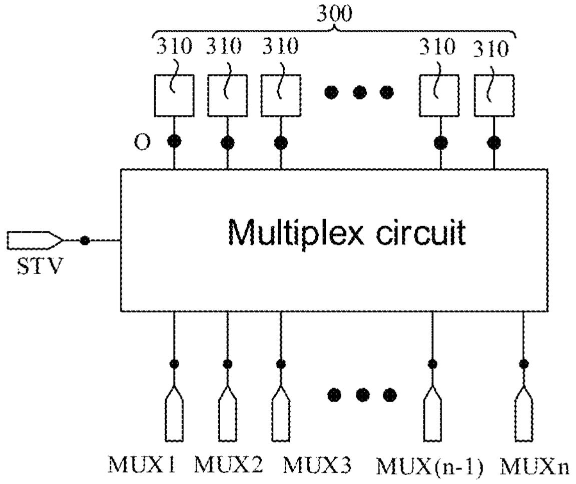
FIG. 6 is a structural diagram of a multiplex circuit, in accordance with some embodiments.

Referring to FIGS. 2 and 6, each multiplex circuit 500 is electrically connected to N gate driving circuits 310, configured to output scan signals of a same function, of the N groups of gate driving circuits 300, and the multiplex circuit 500 is further electrically connected to N selection control signal terminals MUX (MUX1 to MUXn) and a start signal terminal STV. It will be understood that, hereinafter, unless otherwise specified, the N selection control signal terminals MUX refer to a first selection control signal terminal MUX1 to an Nth selection control signal terminal MUXn.

For example, the multiplex circuit 500 is electrically connected to first gate driving circuits 311, configured to output the first scan signals, of each of the N groups of gate driving circuits 300.

The multiplex circuit 500 is configured to, under control of a selection control signal (at least one selection control signal) from at least one selection control signal terminal MUX of the N selection control signal terminals MUX, select at least one gate driving circuit 310 of N gate driving circuits 310 (the N gate driving circuits 310 outputting scan signals of the same function), and transmit a start signal from the start signal terminal STV to the selected at least one gate driving circuit 310. That is, in the same period, the multiplex circuit 500 may receive at least one selection control signal, select at least one gate driving circuit 310, and transmit a start signal to each selected gate driving circuit 310.

It will be understood that the number of the "at least one selection control signal terminal" and the number of the "at least one gate driving circuit" are the same, and the "at least one selection control signal terminal" and the "at least one gate driving circuit" are in one-to-one correspondence. For example, under control of two selection control signals from two selection control signal terminals MUX, two gate driving circuits 310 are selected, and the start signal is transmitted to each of the two gate driving circuits 310. A selection control signal from each selection control signal terminal MUX controls the start signal to be transmitted to a gate driving circuit 310 corresponding to the selection control signal terminal MUX.

For example, the N selection control signal terminals MUX are sequentially numbered as a first selection control signal terminal MUX1, a second selection control signal terminals MUX2, . . . , and an Nth selection control signal terminal MUXn.

For example, the N selection control signal terminals MUX and the N display zones AA' are in one-to-one correspondence, and the N display zones AA' and the N gate driving circuits 310 are in one-to-one correspondence.

For example, the first selection control signal terminal MUX1 corresponds to the first group of gate driving circuits 301 and the first display zone AA1, the second selection control signal terminal MUX2 corresponds to the second group of gate driving circuits 302 and the second display zone AA2, . . . , and the Nth selection control signal terminal MUXn corresponds to the Nth group of gate driving circuits 30*n* and the Nth display zone AAn, that is, the N selection control signal terminals MUX correspond to the N display zones AA' one by one according to the numbering sequence.

For example, the multiplex circuit 500 is configured to transmit the start signal from the start signal terminal STV to gate driving circuits 310 in an Mth group of gate driving circuits 30*m* under control of a selection control signal of an Mth selection control signal terminal MUXm, so that the gate driving circuits 310 of the Mth group of gate driving circuits 30*m* start to operate under the control of the start signal, and output scan signals to the plurality of rows of pixel circuits 100 in the Mth display zone AAm.

In the display substrate 1100 provided in the embodiments of the disclosure, the multiplex circuit 500 may divide a start signal from the start signal terminal STV into N start signals, and may transmit the N start signals to the selected at least one gate driving circuit 310 through the N selection control signal terminals MUX, so that gate driving circuit(s) 310 in selected at least one group of gate driving circuits 300 start to operate. In this way, the number of start signals transmitted from the timing controller 1400 required by the display substrate 1100 may be reduced, and the number of pins 400 electrically connected to the start signal terminal STV is reduced, which is conducive to reducing the connection difficulty between the COF 1500 and the pins 400 and increasing the connection reliability between the COF 1500 and the pins 400. In addition, it is conducive to reducing the number of signal lines in the bonding region Pad of the display substrate 1100, and reducing the wiring difficulty of the bonding region Pad.

Figure 7:
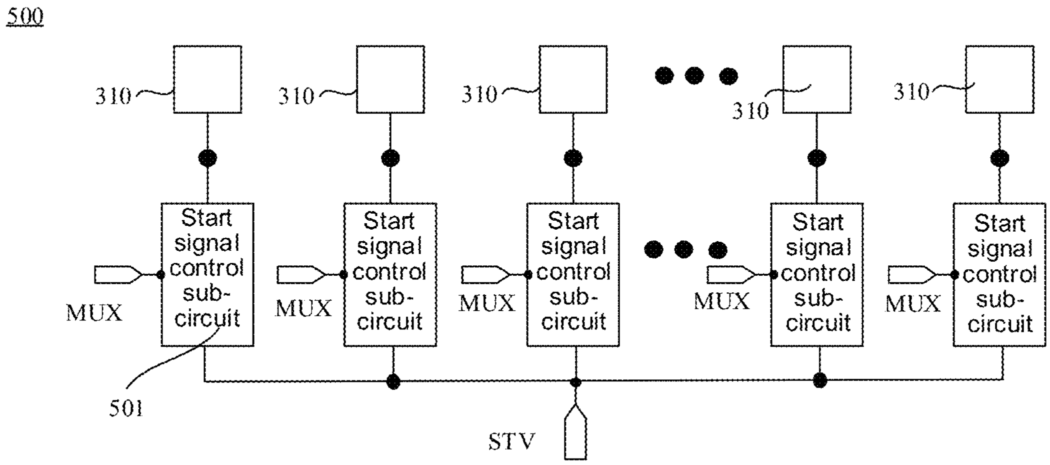
FIG. 7 is a structural diagram of another multiplex circuit, in accordance with some embodiments.

In some embodiments, referring to FIG. 7, the multiplex circuit 500 includes N start signal control sub-circuits 501. Each start signal control sub-circuits 501 is electrically connected to the start signal terminal STV, one selection control signal terminal MUX of the N selection control signal terminals MUX, and one gate driving circuit 310 of the N gate driving circuits 310, and is configured to transmit the start signal to the gate driving circuit 310 under control of a selection control signal.

It should be noted that, in the embodiments of the present disclosure, unless otherwise specified, the "N gate driving circuits 310" refers to N gate driving circuits, used to output scan signals of the same function, of the N groups of gate driving circuits 300.

The N start signal control sub-circuits 501 are electrically connected to the same start signal terminal STV, and different start signal control sub-circuits 501 are electrically connected to different selection control signal terminals MUX and different gate driving circuits 310. In this way, each selection control signal terminal MUX can control only one start signal control sub-circuit 501 in a single multiplex circuit 500 to transmit the start signal to a single gate driving circuit 310 in only one group of gate driving circuits 300.

Figure 8:
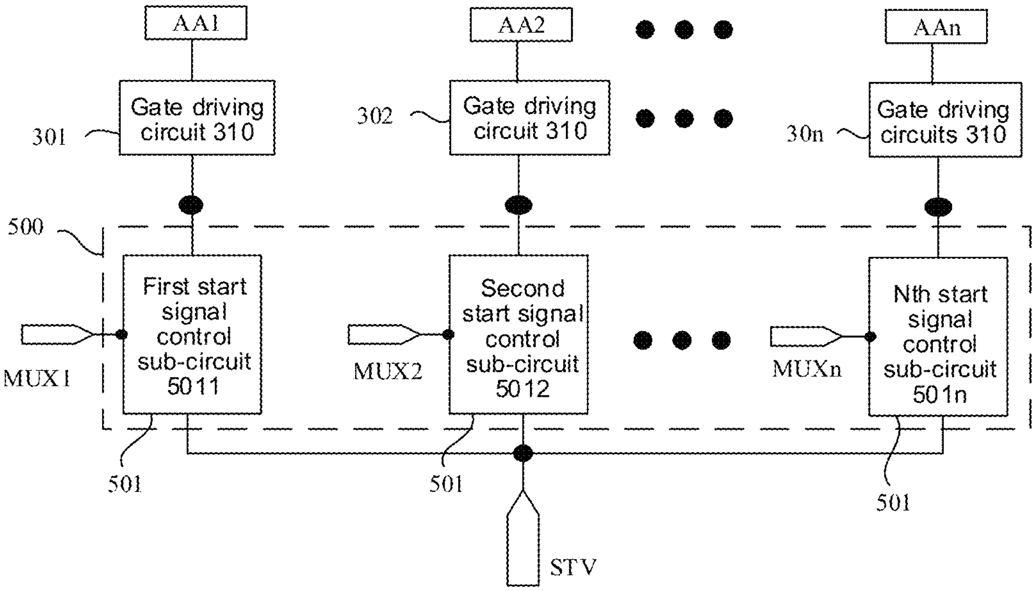
FIG. 8 is a structural diagram of yet another multiplex circuit, in accordance with some embodiments.

For example, referring to FIG. 8, the N start signal control sub-circuits 501 may be numbered sequentially as a first start signal control sub-circuit 5011, a second start signal control sub-circuit 5012, . . . , an Nth start signal control sub-circuit 501*n*.

Each start signal control sub-circuit 501 corresponds to one display zone AA'. For example, the first start signal control sub-circuit 5011 corresponds to the first display zone AA1, the second start signal control sub-circuit 5012 corresponds to the second display zone AA2, . . . , and the Nth start signal control sub-circuit 501*n* corresponds to the Nth display zone AAn. That is, the N start signal control sub-circuits 501 correspond to the N display zones AA' one by one according to the numbering sequence.

For example, referring to FIG. 8, the first start signal control sub-circuit 5011 is electrically connected to the start signal terminal STV, the first selection control signal terminal MUX1 and a single gate driving circuit 310 in the first group of gate driving circuits 301 corresponding to the first display zone AA1. The first start signal control sub-circuit 5011 is configured to transmit the start signal to the single gate driving circuit 310 in the first group of gate driving circuits 301 under control of a first selection control signal from the first selection control signal terminal MUX1, and control the gate driving circuit 310 to start to output scan signals to the plurality of rows of pixel circuits 100 in the first display zone AA' row by row. Other start signal control sub-circuits 501 are similar to the first start signal control sub-circuit 5011, which will not be repeated here.

Figure 9:
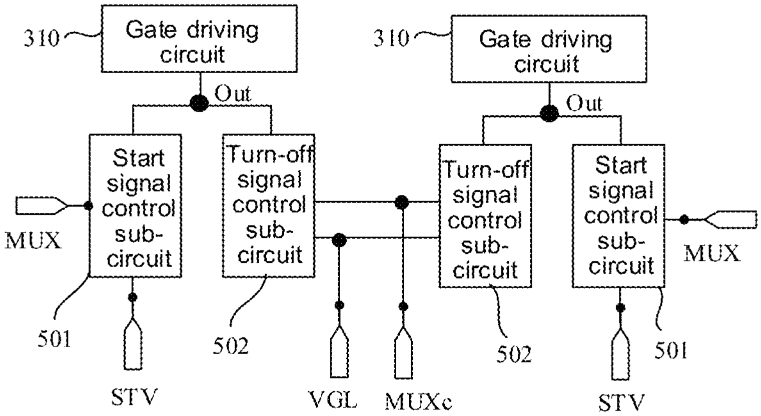
FIG. 9 is a structural diagram of yet another multiplex circuit, in accordance with some embodiments.

In some embodiments, referring to FIG. 9, the multiplex circuit 500 further includes N turn-off signal control sub-circuits 502. Each turn-off signal control sub-circuit 502 is electrically connected to a first clock signal terminal MUXc, a first voltage signal terminal VGL, and a gate driving circuit 310 of the N gate driving circuits 310. The turn-off signal control sub-circuit 502 is configured to transmit a first voltage signal from the first voltage signal terminal VGL to a gate driving circuit 310 of a group of gate driving circuits 300 under control of a first clock signal from the first clock signal terminal MUXc. That is, the first clock signal may control the N turn-off signal control sub-circuits 502 to simultaneously transmit the first voltage signal to the N gate driving circuits 310, outputting signals of the same function, of the N groups of gate driving circuits 300. FIG. 9 only schematically illustrates two turn-off signal control sub-circuits 502.

The N turn-off signal control sub-circuits 502 are electrically connected to the same first clock signal terminal MUXc, and different turn-off signal control sub-circuits 502 are electrically connected to gate driving circuits 310, configured to output scan signals of the same function, of different groups of gate driving circuits 300. The first voltage signal terminal VGL may be a signal terminal continuously outputting a turn-off voltage.

For example, in a case where transistors included in the gate driving circuit 310 are N-type transistors, the first voltage signal terminal VGL may be a signal terminal continuously outputting a low voltage.

Figure 10:
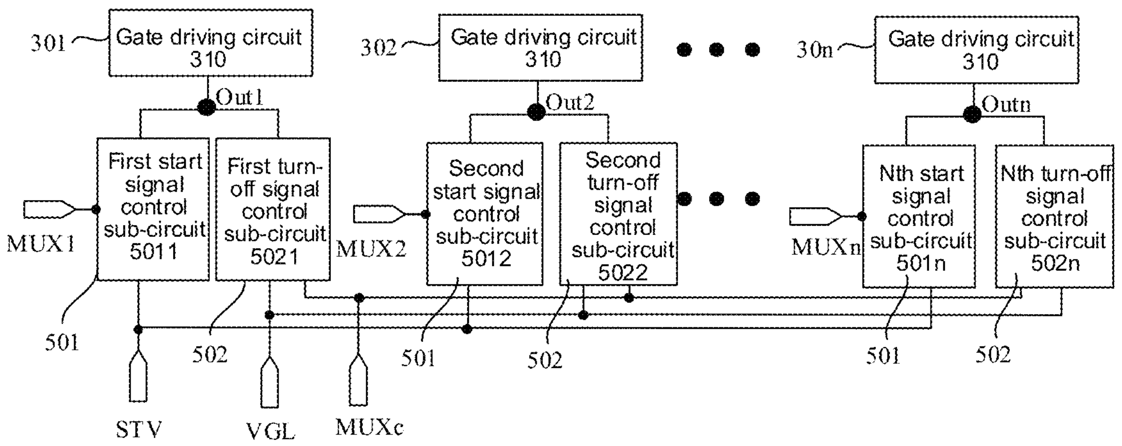
FIG. 10 is a structural diagram of yet another multiplex circuit, in accordance with some embodiments.

For example, referring to FIG. 10, the N turn-off signal control sub-circuits 502 may be numbered sequentially as a first turn-off signal control sub-circuit 5021, a second turn-off signal control sub-circuit 5022, . . . , and an Nth turn-off signal control sub-circuit 502*n*. Each turn-off signal control sub-circuit 502 is electrically connected to a gate driving circuit 310 of a group of gate driving circuits 300. For example, the first turn-off signal control sub-circuit 5021 is electrically connected to a gate driving circuit 310 of the first group of gate driving circuits 301, the second turn-off signal control sub-circuit 5022 is electrically connected to a gate driving circuit 310 of the second group of gate driving circuits 302, . . . , and the Nth turn-off signal control sub-circuit 502*n* is electrically connected to a gate driving circuits 310 of the Nth group of gate driving circuits 30*n*.

In some embodiments, referring to FIG. 9, the multiplex circuit 500 further includes N signal output nodes Out. A signal output node Out is a common node to which a start signal control sub-circuit 501, a turn-off signal control sub-circuit 502, and a gate driving circuit 310 are connected. A start signal control sub-circuit 501 and a turn-off signal control sub-circuit 502, which are electrically connected to the same gate driving circuit 310, are electrically connected to one gate driving circuit 310 through one signal output node Out. In this way, the number of signal lines between the multiplex circuit 500 and the gate driving circuit 310 may be reduced, which is conducive to reducing the wiring difficulty of the display substrate 1100.

For example, referring to FIG. 10, the N signal output nodes Out may be sequentially numbered as a first signal output node Out1, a second signal output node Out2, . . . , and an Nth signal output node Outn. The first start signal control sub-circuit 5011 and the first turn-off signal control sub-circuit 5021 may be electrically connected to a single gate driving circuit 310 of the first group of gate driving circuits 301 through the first signal output node Out1. Hereinafter, the N signal output nodes Out refer to the first signal output node Out1 to the Nth signal output node Outn.

Figure 11:
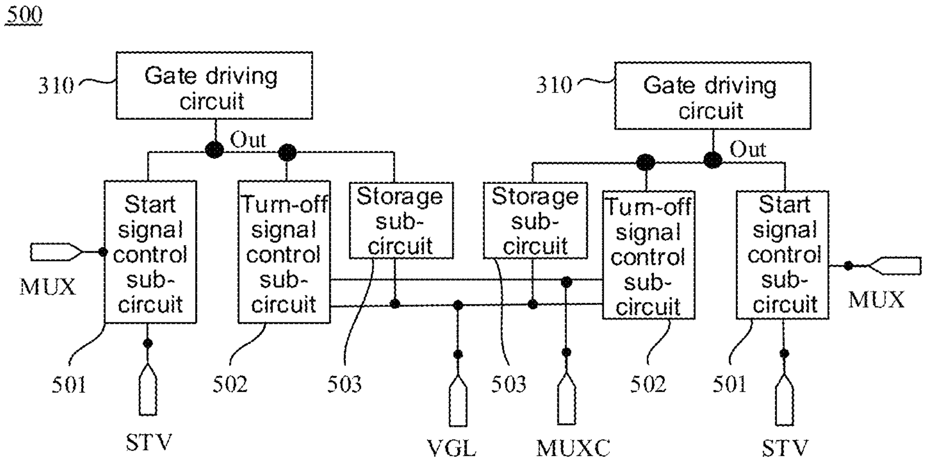
FIG. 11 is a structural diagram of yet another multiplex circuit, in accordance with some embodiments.

Referring to FIG. 11, the multiplex circuit 500 further includes N storage sub-circuits 503. Each storage sub-circuit 503 is electrically connected to the first voltage signal terminal VGL and a signal output node Out, and is configured to maintain a voltage of the signal output node Out. Different storage sub-circuits 503 in the N storage sub-circuits 503 are electrically connected to different signal output nodes Out. FIG. 11 schematically illustrates only two storage sub-circuits 503.

Figure 12:
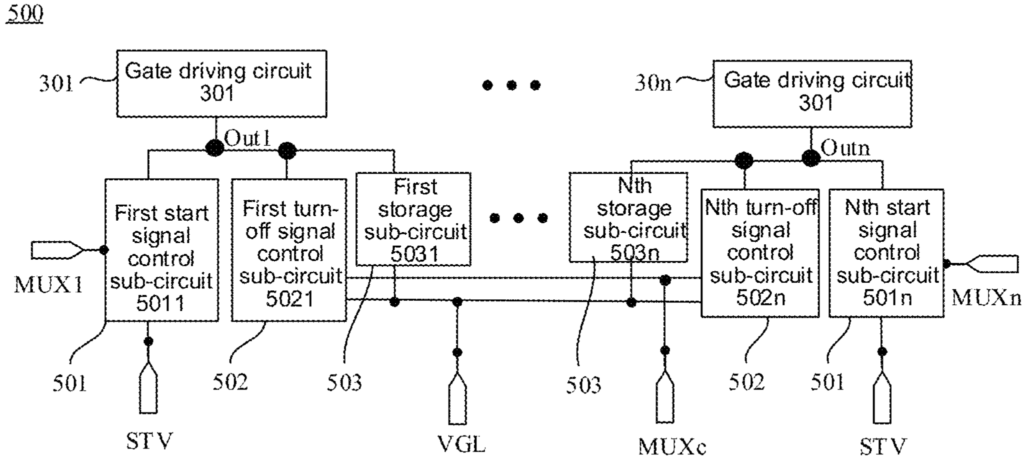
FIG. 12 is a structural diagram of yet another multiplex circuit, in accordance with some embodiments.

It will be understood that, the number of the storage sub-circuits 503, the number of the start signal control sub-circuits 501, and the turn-off signal control sub-circuits 502 are equal; and the storage sub-circuits 503 and the start signal control sub-circuits 501 are in one-to-one correspondence, and the start signal control sub-circuits 501 and the turn-off signal control sub-circuits 502 are in one-to-one correspondence. For example, referring to FIG. 12, the first start signal control sub-circuit 5011, the first turn-off signal control sub-circuit 5021 and the first storage sub-circuit 5031 are electrically connected to the gate driving circuit 310 of the first group of gate driving circuits 301 through the first signal output node Out1.

Figure 13:
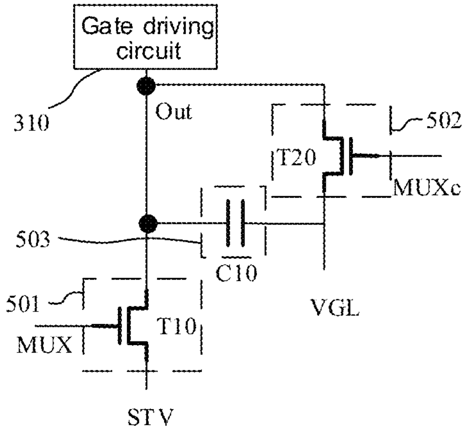
FIG. 13 is an equivalent circuit diagram of a multiplex circuit, in accordance with some embodiments.

In some embodiments, reference is made to FIG. 13, FIG. 13 schematically illustrates only one start signal control sub-circuit 501, one turn-off signal control sub-circuit 502, and one storage sub-circuit 503.

The start signal control sub-circuit 501 includes a first transistor T10, a control electrode of the first transistor T10 is electrically connected to a selection control signal terminal MUX, a first electrode of the first transistor T10 is electrically connected to a start signal terminal STV, and a second electrode of the first transistor T10 is electrically connected to a gate driving circuit 310 (through a signal output node Out).

The turn-off signal control sub-circuit 502 includes a second transistor T20, a control electrode of the second transistor T20 is electrically connected to the first clock signal terminal MUXc, a first electrode of the second transistor T20 is electrically connected to the first voltage signal terminal VGL, and a second electrode of the second transistor T20 is electrically connected to the gate driving circuit 310 (through the signal output node Out).

The storage sub-circuit 503 includes a first capacitor C10, a first electrode plate of the first capacitor C10 is electrically connected to the first voltage signal terminal VGL, and a second electrode plate of the first capacitor C10 is electrically connected to the gate driving circuit 310 (through the signal output node Out).

In some embodiments, the display substrate 1100 includes X multiplex circuits 500; the X multiplex circuits 500 are electrically connected to the X start signal terminals, respectively; and the X multiplex circuits 500 are electrically connected to X gate driving circuits of each group of gate driving circuits, respectively. That is, each multiplex circuit 500 is electrically connected to a single start signal terminal STV, different multiplex circuits 500 are electrically connected to different start signal terminals STV, and different multiplex circuits 500 are electrically connected to gate driving circuits 310, configured to output scan signals of different functions, of the same group of gate driving circuits 300.

Therefore, the number of the start signal terminals STV may be further reduced, the number of pins electrically connected to the start signal terminals is reduced, and the difficulty of the wiring in the bonding region Pad is reduced.

Figure 14:
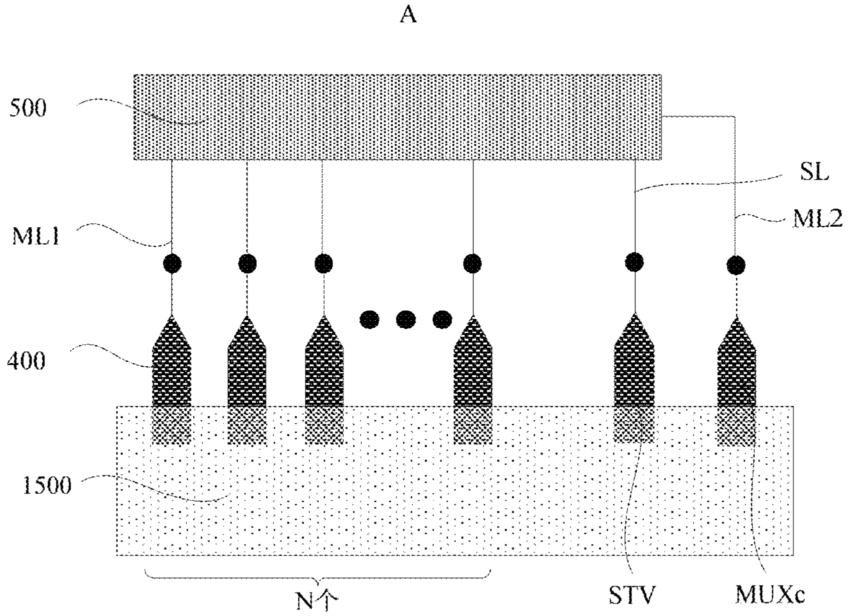
FIG. 14 is a partial enlarged view of the region A in FIG. 2.

In some embodiments, referring to FIG. 14, FIG. 14 is a partial enlarged view of the region A in FIG. 2. The display substrate 1100 further includes N selection control signal lines ML1 and X start signal connection lines SL. Each selection control signal line ML1 is used as a selection control signal terminal MUX. Each of the start signal connection lines is used as a start signal terminal STV. FIG. 14 schematically illustrates only one multiplex circuit 500, and selection control signal lines ML1 and a start signal connection line SL that are electrically connected to the one multiplex circuit 500.

Each selection control signal line ML1 is electrically connected to one pin 400 and X multiplex circuits 500. The timing controller 1400 inputs a selection control signal to the X multiplex circuits 500 through the pin 400 and the selection control signal line ML1. Each start signal connection line SL is electrically connected to one pin 400 and one multiplex circuit 500.

In a case where the multiplex circuit 500 includes the N start signal control sub-circuits 501, X start signal control sub-circuits 501 of X multiplex circuits 500, which are electrically connected to the same selection control signal line ML1, are electrically connected to X gate driving circuits 310 of the same group of gate driving circuits 300, and different start signal control sub-circuits 501 are electrically connected to different gate driving circuits 310. That is, a single selection control signal line ML1 is electrically connected to X start signal control sub-circuits 501 of different multiplex circuits 500 that are electrically connected to different gate driving circuits 310 of the same group of gate driving circuits 300. In this way, different multiplex circuits 500 share N selection control signal lines ML1, which is conducive to further reducing the number of signals required to be output by the timing controller 1400 and reducing the control difficulty of the display substrate 1100. In addition, the number of the pins 400 of the display substrate 1100 can be reduced.

The display substrate 1100 further includes a first clock signal line ML2, and the first clock signal line ML2 is used as the first clock signal terminal MUXc. The first clock signal line ML2 is electrically connected to one pin 400 and X multiplex circuits 400.

In a case where the multiplex circuit 500 includes the N turn-off signal control sub-circuits 502, the first clock signal line ML2 is electrically connected to N turn-off signal control sub-circuits 502 of each multiplex circuit 500 of the X multiplex circuits 500. That is, the X multiplex circuits 500 share the same first clock signal line ML2, which is conducive to reducing the number of signals output by the timing controller 1400 and reducing the control difficulty of the display substrate 1100. In addition, the number of the pins 400 of the display substrate 1100 can be reduced.

For example, in the embodiments of the present disclosure, the display substrate 1100 may include the pins 400 with the number of N+X+1. The N pins 400 correspond to the N selection control signal terminals MUX, and are configured to receive N different selection control signals. The X pins 400 correspond to start signal terminals STV of the X multiplex circuits 500, and are configured to receive X start signals of different functions. The one pin 400 corresponds to the first clock signal terminal MUXc, and is configured to receive one first clock signal. Compared with the related art in which N×X pins 400 are required, the present disclosure can significantly reduce the number of the pins 400.

In some embodiments, in a case where the pixel circuit 110 is the "5T1C" circuit and each group of gate driving circuits 300 includes four gate driving circuits 310, the four gate driving circuits 310 may include a first gate driving circuit 311, a second gate driving circuit 312, a third gate driving circuit 313 and a light-emitting control circuit 314.

Each first gate driving circuit 311 is configured to output first scan signals to a plurality of rows of pixel circuits 100 (a plurality of first scan signal lines GL1) in a display zone AA', so as to control data writing transistors T2 to be turned on. Each second gate driving circuit 312 is configured to output second scan signals to a plurality of rows of pixel circuits 100 (a plurality of second scan signal lines GL2) in a display zone AA', so as to control first initialization transistors T3 to be turned on. Each third gate driving circuit 313 is configured to output third scan signals to a plurality of rows of pixel circuits 100 (a plurality of third scan signal lines GL3) in a display zone AA', so as to control second initialization transistors T4 to be turned on. Each light-emitting control circuit 314 is configured to output fourth scan signals to a plurality of rows of pixel circuits 100 (a plurality of fourth scan signal lines GL4) in a display zone AA', so as to control light-emitting control transistors T5 to be turned on.

The display substrate 1100 may include four multiplex circuits 500 corresponding to the four gate driving circuits 310, and the four multiplex circuits 500 may include a first multiplex circuit 510, a third multiplex circuit 530, a fourth multiplex circuit 540, and a fifth multiplex circuit 550.

Figure 15:
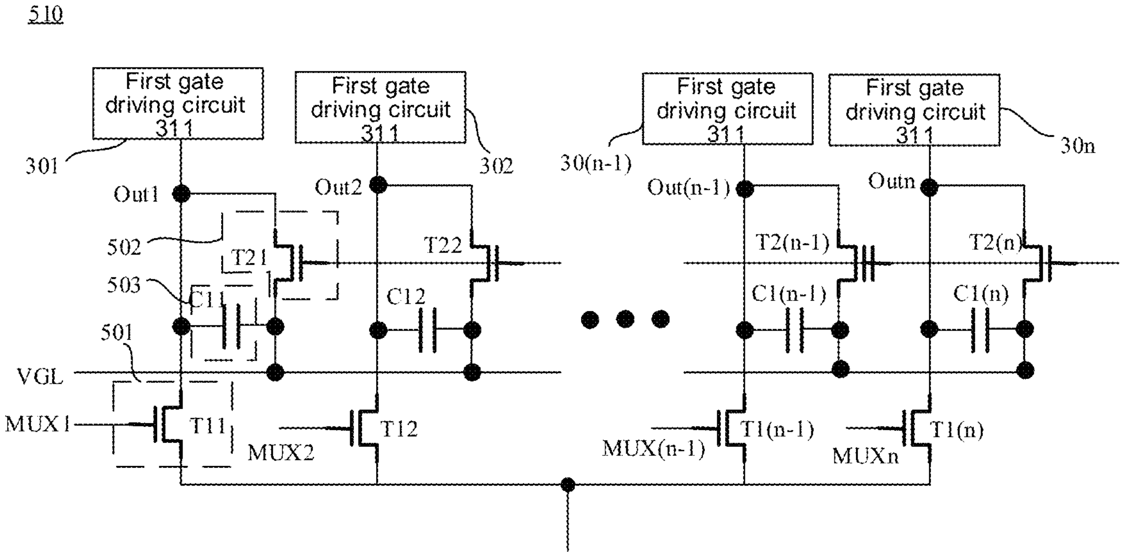
FIG. 15 is an equivalent circuit diagram of a first multiplex circuit, in accordance with some embodiments.

Referring to FIG. 15, the first multiplex circuit 510 corresponds to first gate driving circuits 311, and the first multiplex circuit 510 is electrically connected to a first start signal terminal STV1, the N selection control signal terminals MUX, and N first gate driving circuits 311 of the N groups of gate driving circuits 300.

The first multiplex circuit 510 is configured to, under control of a selection control signal from at least one selection control signal terminal MUX of the N selection control signal terminals MUX, select at least one first gate driving circuit 311 of the N first gate driving circuits 311, and transmit a first start signal from the first start signal terminal STV1 to the selected at least one first gate driving circuit 311, so as to control the first gate driving circuit(s) 311 to start to output first scan signals to a corresponding display zone AA' row by row.

For example, the first multiplex circuit 510 is configured to transmit the first start signal from the first start signal terminal STV1 to a first gate driving circuit 311 of the Mth group of gate driving circuits **30*m* corresponding to the Mth display zone AAm under control of the selection control signal of the Mth selection control signal terminal MUXm, so that the first gate driving circuit 311 of the Mth group of gate driving circuits 30***m* starts to operate; here, M is greater than or equal to 1 and less than or equal to N (1≤M≤N).

For example, referring to FIG. 15, the first multiplex circuit 510 includes N start signal control sub-circuits 501, N turn-off signal control sub-circuits 502, and N storage sub-circuits 503. The first multiplex circuit 510 has a similar structure as the multiplex circuit 500 described in any of the above embodiments, which will not be repeated here. In FIG. 15, N first transistors T10 included in the N start signal control sub-circuits 501 are sequentially numbered as T11, T12, . . . , T1(*n*−1), and T1*n*; N second transistors T20 included in the N turn-off signal control sub-circuits 502 are sequentially numbered as T21, T22, . . . , T2(*n*−1), and T2*n*; and N first capacitors C10 included in the N storage sub-circuits 503 are sequentially numbered as C11, C12, . . . , C1(*n*−1), and C1*n*.

Figure 16:
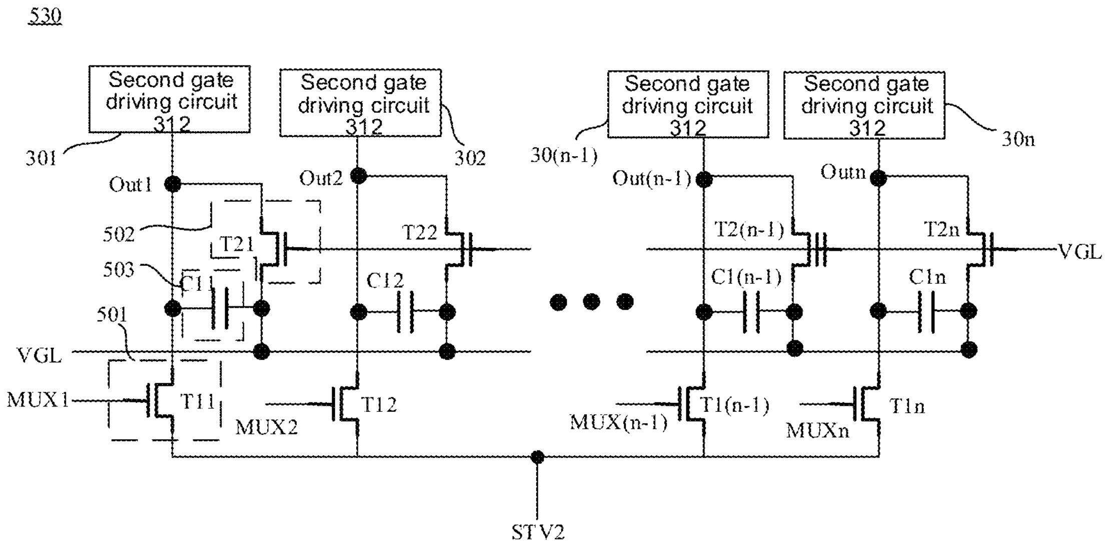
FIG. 16 is an equivalent circuit diagram of a third multiplex circuit, in accordance with some embodiments.

Referring to FIG. 16, the third multiplex circuit 530 corresponds to second gate driving circuits 312, and the third multiplex circuit 530 is electrically connected to a second start signal terminal STV2, the N selection control signal terminals MUX, and N second gate driving circuits 312 of the N groups of gate driving circuits 300.

The third multiplex circuit 530 is configured to, under control of a selection control signal from at least one selection control signal terminal MUX of the N selection control signal terminals MUX, select at least one second gate driving circuit 312 of the N second gate driving circuits 312, and transmit a second start signal from the second start signal terminal STV2 to the selected at least one second gate driving circuit 312, so as to control the second gate driving circuit(s) 312 to start to operate and output second scan signals to a corresponding display zone AA' row by row.

For example, the third multiplex circuit 530 is configured to transmit the second start signal from the second start signal terminal STV2 to a second gate driving circuit 312 of the Mth group of gate driving circuits 30*m* corresponding to the Mth display zone AAm under control of the selection control signal of the Mth selection control signal terminal MUXm, so that the second gate driving circuit 312 of the Mth group of gate driving circuits 30*m* starts to operate; here, 1≤M≤N.

For example, referring to FIG. 16, the third multiplex circuit 530 includes N start signal control sub-circuits 501, N turn-off signal control sub-circuits 502, and N storage sub-circuits 503. The third multiplex circuit 530 has a similar structure as the multiplex circuit 500 described in any of the above embodiments, which will not be repeated here. In FIG. 16, N first transistors T10 included in the N start signal control sub-circuits 501 are sequentially numbered as T11, T12, . . . , T1(*n*−1), and T1*n*; N second transistors T20 included in the N turn-off signal control sub-circuits 502 are sequentially numbered as T21, T22, . . . , T2(*n*−1), and T2*n*; and N first capacitors C10 included in the N storage sub-circuits 503 are sequentially numbered as C11, C12, . . . , C1(*n*−1), and C1*n*.

For example, in the first multiplex circuit 510 and the third multiplex circuit 530, the first transistors T10 with the same number may be electrically connected to the same selection control signal terminal MUX.

Figure 17:
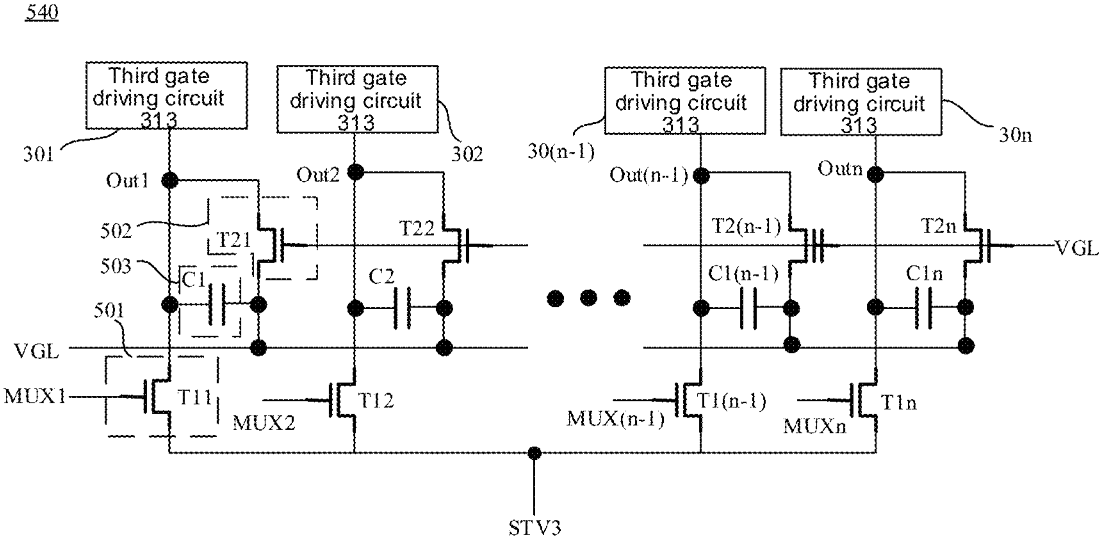
FIG. 17 is an equivalent circuit diagram of a fourth multiplex circuit, in accordance with some embodiments.

Referring to FIG. 17, the fourth multiplex circuit 540 corresponds to third gate driving circuits 313, and the fourth multiplex circuit 540 is electrically connected to a third start signal terminal STV3, the N selection control signal terminals MUX, and N third gate driving circuits 313 of the N groups of gate driving circuits 300.

The fourth multiplex circuit 540 is configured to, under control of a selection control signal from at least one selection control signal terminal MUX of the N selection control signal terminals MUX, select at least one third gate driving circuit 313 of the N third gate driving circuits 313, and transmit a third start signal from the third start signal terminal STV3 to the selected at least one third gate driving circuit 313, so as to control the third gate driving circuit(s) 313 to start to operate and output third scan signals to a corresponding display zone AA' row by row.

For example, the fourth multiplex circuit 540 is configured to transmit the third start signal from the third start signal terminal STV3 to a third gate driving circuit 313 of the Mth group of gate driving circuits 30*m* corresponding to the Mth display zone AAm under control of the selection control signal of the Mth selection control signal terminal MUXm, so that the third gate driving circuit 313 of the Mth group of gate driving circuits 300 starts to operate; here, 1≤M≤N.

For example, referring to FIG. 17, the fourth multiplex circuit 540 includes N start signal control sub-circuits 501, N turn-off signal control sub-circuits 502, and N storage sub-circuits 503. The fourth multiplex circuit 540 has a similar structure as the multiplex circuit 500 described in any of the above embodiments, which will not be repeated here. In FIG. 17, N first transistors T10 included in the N start signal control sub-circuits 501 are sequentially numbered as T11, T12, . . . , T1 (n−1), and T1*n*; N second transistors T20 included in the N turn-off signal control sub-circuits 502 are sequentially numbered as T21, T22, . . . , T2(*n*−1), and T2*n*; and N first capacitors C10 included in the N storage sub-circuits 503 are sequentially numbered as C11, C12, . . . , C1(*n*−1), and C1*n*.

For example, in the first multiplex circuit 510, the third multiplex circuit 530 and the fourth multiplex circuit 540, the first transistors T10 with the same number may be electrically connected to the same selection control signal terminal MUX.

Figure 18:
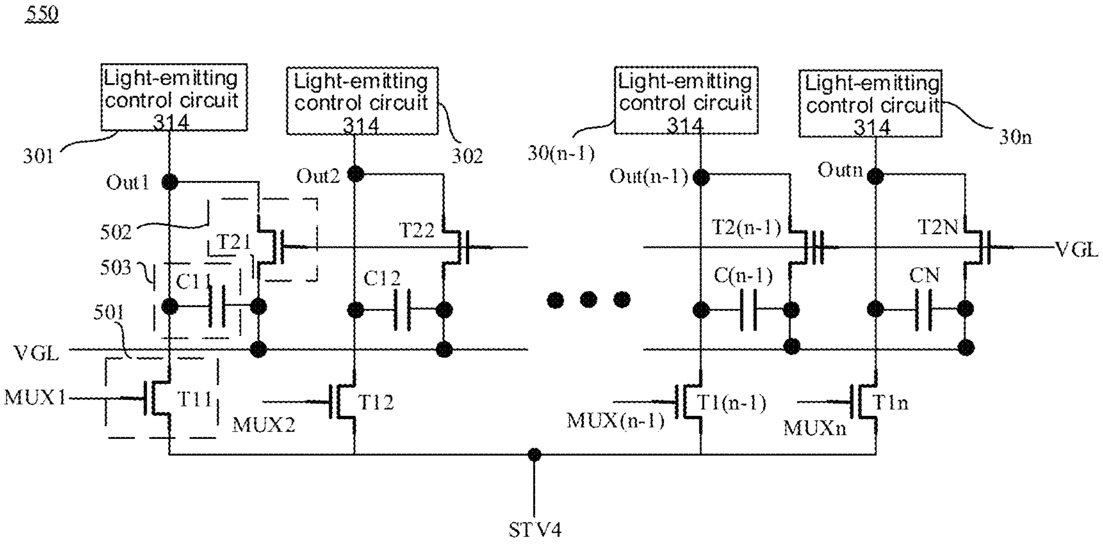
FIG. 18 is an equivalent circuit diagram of a fifth multiplex circuit, in accordance with some embodiments.

Referring to FIG. 18, the fifth multiplex circuit 550 corresponds to light-emitting control circuits 314, and the fifth multiplex circuit 550 is electrically connected to a fourth start signal terminal STV4, the N selection control signal terminals MUX, and light-emitting control circuits 314 of the N groups of gate driving circuits 300.

The fifth multiplex circuit 550 is configured to, under control of a selection control signal from at least one selection control signal terminal MUX of the N selection control signal terminals MUX, select at least one light-emitting control circuit 314 of the N light-emitting control circuits 314, and transmit a fourth start signal from the fourth start signal terminal STV4 to the selected at least one light-emitting control circuit 314, so as to control the light-emitting control circuit(s) 314 to start to output fourth scan signals to a corresponding display zone AA' row by row.

For example, the fifth multiplex circuit 550 is configured to transmit the fourth start signal from the fourth start signal terminal STV4 to a light-emitting control circuit 314 of the Mth group of gate driving circuits 30*m* corresponding to the Mth display zone AAm under control of the selection control signal of the Mth selection control signal terminal MUXm, so that the light-emitting control circuit 314 of the Mth group of gate driving circuits 30*m* starts to operate; here, 1≤M≤N.

For example, referring to FIG. 18, the third multiplex circuit 530 includes N start signal control sub-circuits 501, N turn-off signal control sub-circuits 502, and N storage sub-circuits 503. The fifth multiplex circuit 550 has a similar structure as the multiplex circuit 500, which will not be repeated here. In FIG. 18, N first transistors T10 included in the N start signal control sub-circuits 501 are sequentially numbered as T11, T12, . . . , T1(*n*−1), and T1*n*; N second transistors T20 included in the N turn-off signal control sub-circuits 502 are sequentially numbered as T21, T22, . . . , T2(*n*−1), and T2*n*; and N first capacitors C10 included in the N storage sub-circuits 503 are sequentially numbered as C11, C12, . . . , C1(*n*−1), and C1*n*.

For example, in the first multiplex circuit 510, the third multiplex circuit 530, the fourth multiplex circuit 540 and the fifth multiplex circuit 550, control electrodes of the first transistors T10 with the same number are electrically connected to the same selection control signal terminal MUX and different gate driving circuits 310 of the same group of gate driving circuits 300. For example, first transistors T10, numbered T11, are all electrically connected to the first selection control signal terminal MUX1; the first transistors T11 of the first multiplex circuit 510 are electrically connected to the first gate driving circuit 311 of the first group of gate driving circuits 301; the first transistors T11 of the third multiplex circuit 530 are electrically connected to the second gate driving circuit 312 of the first group of gate driving circuits 301; the first transistors T11 of the fourth multiplex circuit 540 are electrically connected to the third gate driving circuit 313 of the first group of gate driving circuits 301; and the first transistors T11 of the fifth multiplex circuit 550 are electrically connected to the light-emitting control circuit 314 of the first group of gate driving circuits 301.

Figure 19:
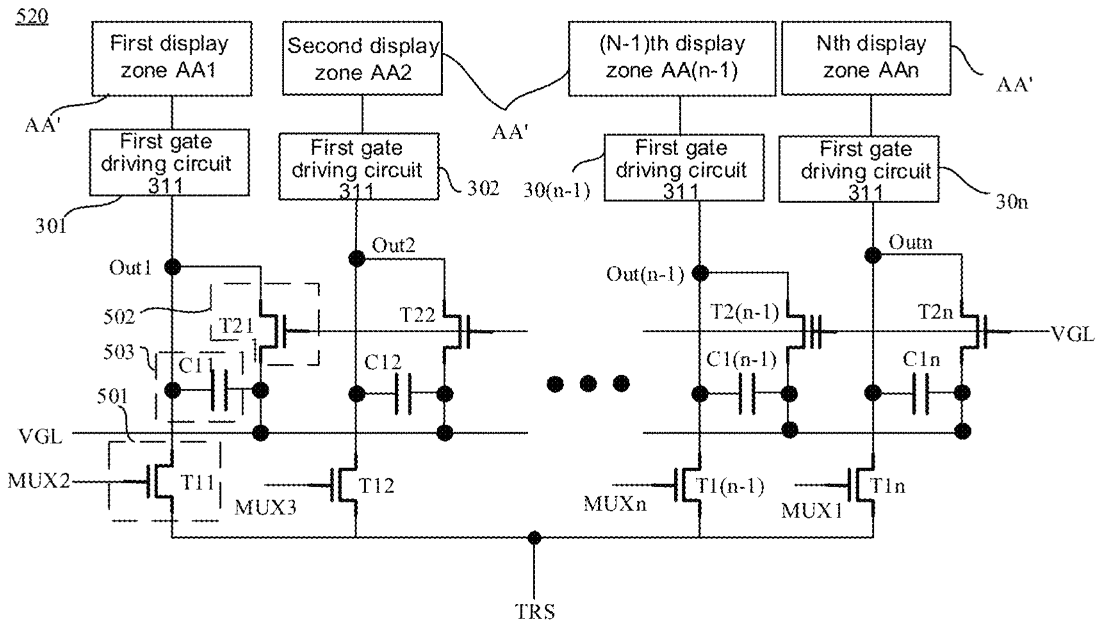
FIG. 19 is an equivalent circuit diagram of a second multiplex circuit, in accordance with some embodiments.

In some embodiments, referring to FIG. 19, the display substrate 1100 further includes a second multiplex circuit 520, and the second multiplex circuit 520 is electrically connected to an initialization signal terminal TRS, the N selection control signal terminals MUX, and the N first gate driving circuits 311 of the N groups of gate driving circuits 300.

The second multiplex circuit 520 is configured to, under control of a selection control signal from at least one selection control signal terminal MUX of the N selection control signal terminals MUX, select at least one first gate driving circuit 311 of the N first gate driving circuits 311, and transmit an initialization signal from the initialization signal terminal TRS to the selected at least one gate driving circuit 311.

For example, referring to FIG. 19, the second multiplex circuit 520 includes N start signal control sub-circuits 501, N turn-off signal control sub-circuits 502, and N storage sub-circuits 503. The second multiplex circuit 520 has a similar structure as the multiplex circuit 500 described in any of the above embodiments, which will not be repeated here. In FIG. 19, N first transistors T10 included in the N start signal control sub-circuits 501 are sequentially numbered as T11, T12, . . . , T1(*n*−1), and T1*n*; N second transistors T20 included in the N turn-off signal control sub-circuits 502 are sequentially numbered as T21, T22, . . . , T2(*n*−1), and T2*n*; and N first capacitors C10 included in the N storage sub-circuits 503 are sequentially numbered as C11, C12, . . . , C1(*n*−1), and C1*n*.

Figure 20:
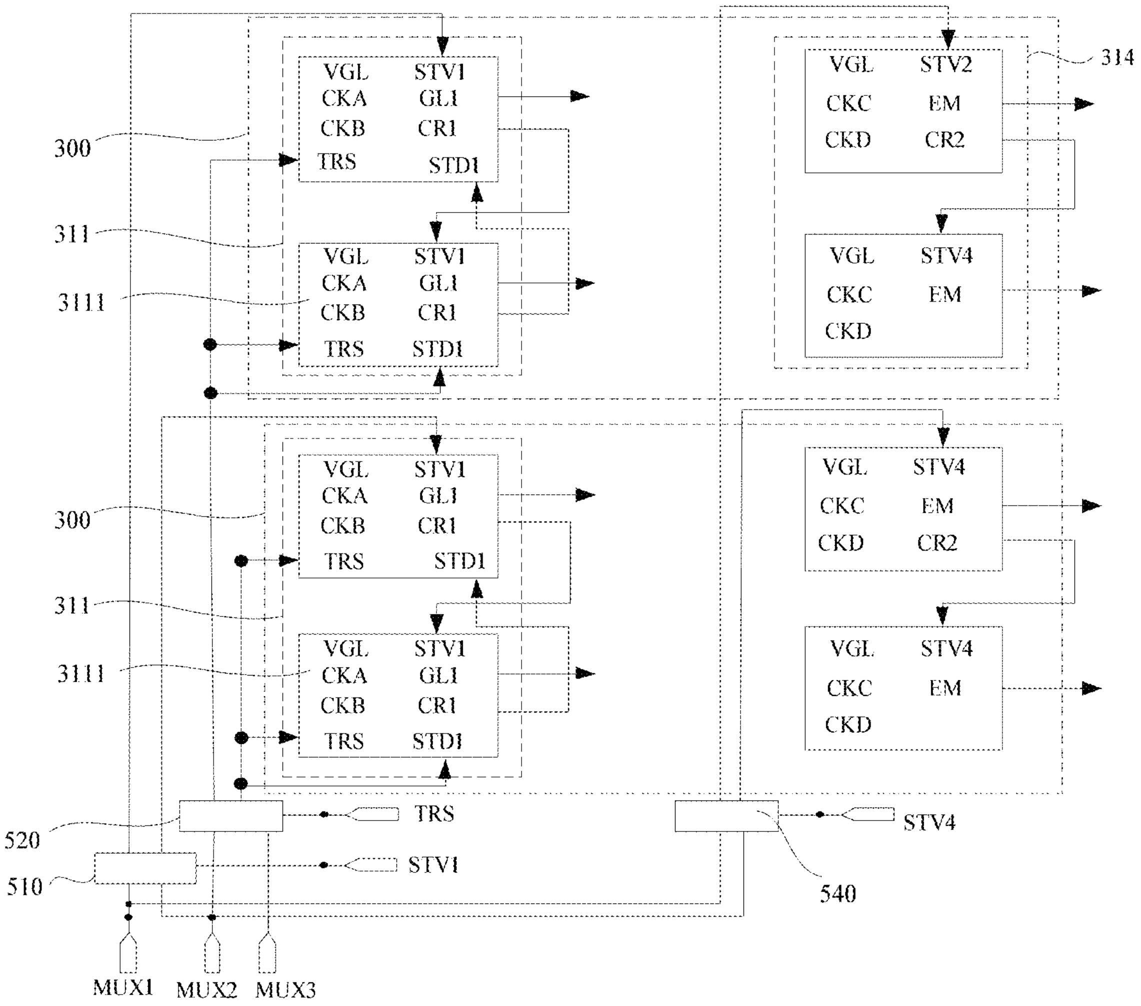
FIG. 20 is a diagram showing a cascade relationship of a gate driving circuit, in accordance with some embodiments.

Referring to FIG. 20, the first gate driving circuit 311 includes a plurality of first shift register units 3111 that are sequentially connected in cascade, the second multiplex circuit 520 is electrically connected to each first shift register unit 3111 of a first gate driving circuit 311, and the first shift register unit 3111 is configured to initialize a circuit node of the first shift register unit 311 under control of an initialization signal from the second multiplex circuit 520. FIG. 20 schematically illustrates only two groups of gate driving circuits 300 and only four first shift register units 3111 of each group of gate driving circuits 300.

Referring to FIG. 20, the first shift register unit includes a cascade signal output node CR1 and a reset signal receiving terminal STD1. For two first shift register units 3111 that are connected in cascade, a cascade signal output node CR1 of a previous-stage first shift register unit 3111 is electrically connected to a first start signal receiving terminal STV1 of a current-stage first shift register unit 3111, and a cascade signal output node CR1 of the current-stage first shift register unit 3111 is electrically connected to a reset signal receiving terminal STD1 of the previous-stage first shift register unit 3111.

Figure 21:
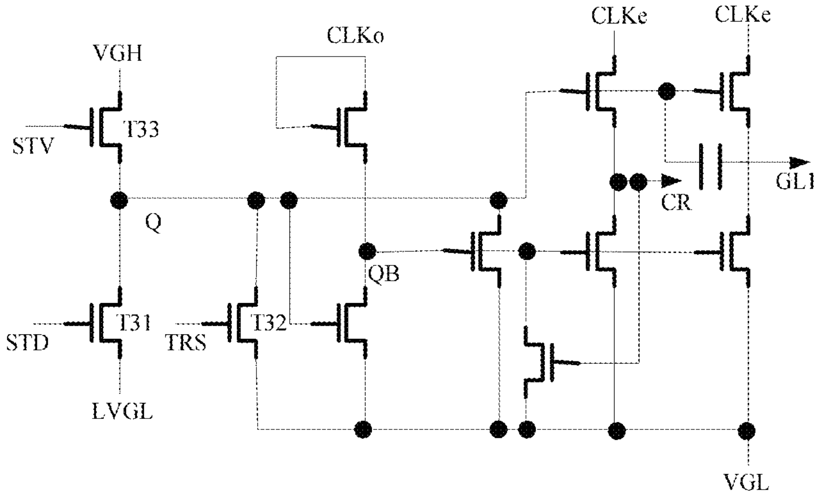
FIG. 21 is an equivalent circuit diagram of a first shift register unit, in accordance with some embodiments.

For example, referring to FIG. 21, FIG. 21 is an equivalent circuit diagram of the first shift register unit 311, and the first shift register unit 311 includes a reset transistor T31 and a third initialization transistor T32. A control electrode of the third initialization transistor T32 is electrically connected to the initialization signal terminal TRS, and a first electrode of the third initialization transistor T32 is electrically connected to the first voltage signal terminal VGL, and a second electrode of the third initialization transistor T32 is electrically connected to a pull-up node Q. The third initialization transistor T32 is configured to transmit the first voltage signal from the first voltage signal terminal VGL to the pull-up node Q under control of the initialization signal from the initialization signal terminal TRS, so as to initialize a circuit node (the pull-up node Q) of the first shift register unit 3111.

It will be understood that the first shift register unit 3111 may further include other transistors; as shown in FIG. 21, the other transistors of the first shift register unit 3111 and the connection relationship therebetween are not particularly limited in the embodiments of the present disclosure; and the first shift register unit 3111 shown in FIG. 21 is merely one possible embodiment, not the only one possible embodiment.

For example, referring to FIG. 19, the second multiplex circuit 520 is configured to transmit the initialization signal from the initialization signal terminal TRS to a first gate driving circuit 311 of an (M−1)th group of gate driving circuits 30(*m*−1) corresponding to an (M−1)th display zone AA(m−1) under control of the selection control signal of the Mth selection control signal terminal MUXm, so as to initialize pull-up nodes Q of first shift register units 3111 of the first gate driving circuit 311 of the (m−1)th group of gate driving circuits 30(*m*−1); here, 1≤M≤N.

Referring to FIGS. 19 and 20, the second multiplex circuit 520 includes N signal output nodes Out, and each signal output node Out of the second multiplex circuit 520 connected to a first gate driving circuit 311 is further electrically connected to a reset signal receiving terminal STD1 of a last-stage (final-stage) first shift register unit 3111 of the first gate driving circuit 311.

For example, a signal output node Outm of the second multiplex circuit 520, which is electrically connected to a first gate driving circuit 311 of the Mth group of gate driving circuits 30*m*, is further electrically connected to a reset signal receiving terminal STD1 of a last-stage first shift register unit 3111 of the first gate driving circuit 311 of the Mth group of gate driving circuits 30*m*.

Referring to FIGS. 8 and 19, under control of a selection control signal from the same selection control signal terminal MUX, the first multiplex circuit 510 transmits the first start signal to a first gate driving circuit 311 of a target group of gate driving circuits, and the second multiplex sub-circuit 520 transmits the initialization signal to a first gate driving circuit 311 of a previous group of gate driving circuits. That is, the previous group of gate driving circuits is electrically connected to a selection control signal terminal MUX corresponding to the target group of gate driving circuits.

In the scan direction −Y of the display region AA, the target group of gate driving circuits is a group of gate driving circuits adjacent to the previous group of gate driving circuits. That is, in the scan direction −Y, the previous group of gate driving circuits and the target group of gate driving circuits are arranged in sequence. In a case where the target group of gate driving circuits is the first group of gate driving circuits (of the N groups of gate driving circuits 300 in the scan direction −Y), the previous group of gate driving circuits is the last group of gate driving circuits (of the N groups of gate driving circuits 300 in the scan direction −Y).

For example, referring to FIG. 19, in a case where the second multiplex circuit 520 includes N start signal control sub-circuits 501, the N start signal control sub-circuits 501 are in one-to-one correspondence with the N display zones AA according to the numbering order, and the N selection control signal terminals MUX are in one-to-one correspondence with the N display zones AA according to the numbering order, an Mth start signal control sub-circuit 501 of the second multiplex circuit 520 is electrically connected to an (M+1)th selection control signal terminal MUX(m+1); here, M is greater than or equal to 1 and less than N ($1 \le M < N$). In a case where M is equal to N, an Nth start signal control sub-circuit 501 of the second multiplex circuit 520 is electrically connected to the first selection control signal terminal MUX1.

For example, referring to FIG. 19, a first start signal control sub-circuit 501 (a first transistor T11), which is electrically connected to the first gate driving circuit 311 of the first group of gate driving circuits 301, is electrically connected to the second selection control signal terminal MUX2. A first start signal control sub-circuit 501 (a first transistor T1*n*), which is electrically connected to the first gate driving circuit 311 of the Nth group of gate driving circuits 30*n*, is electrically connected to the first selection control signal terminal MUX1.

Figure 22:
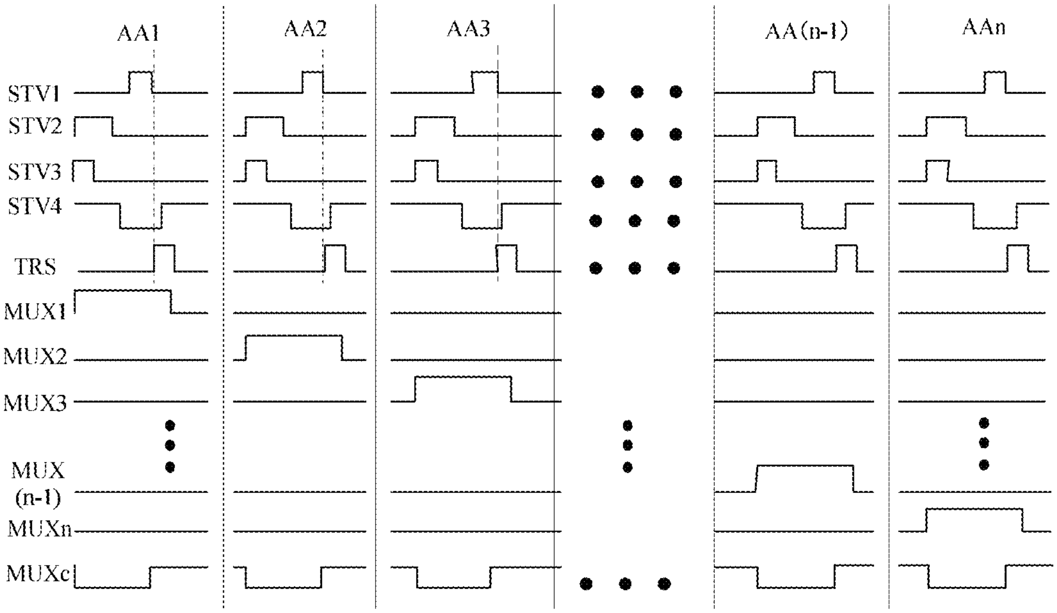
FIG. 22 is a timing control diagram of a display substrate, in accordance with some embodiments.

Some embodiments of the present disclosure provide a driving method of a display substrate, which is configured to the display substrate 1100 described in any one of the embodiments. Referring to FIG. 22, the driving method includes the followings.

At least one of the N selection control signal terminals MUX outputs at least one selection control signal.

Under control of the at least one selection control signal, the multiplex circuit 500 selects at least one gate driving circuit 310 of N gate driving circuits 310 connected to the multiplex circuit 500, and transmits a start signal from the start signal terminal STV to the selected at least one gate driving circuit 310.

For example, referring to FIG. 22, the N selection control signal terminals MUX sequentially output selection control signals according to the numbering order. That is, only one selection control signal terminal MUX outputs a selection control signal at each period. Thus, the N gate driving circuits 310 may be sequentially selected one by one in the scan direction −Y, and the start signal from the start signal terminal STV is sequentially transmitted to the N gate driving circuits 310, the N gate driving circuits 310 sequentially output scan signals to N display zones AA', and the N display zones AA' sequentially start to operate.

It will be understood that, referring to FIG. 22, in a case where the display substrate 1100 includes four multiplex circuits 500, the first start signal terminal STV1, the second start signal terminal STV2, the third start signal terminal STV3, and the fourth start signal terminal STV4, which are respectively electrically connected to the four multiplex circuits 500, may output different pulse signals (clock signals). Thus, different start signals may be input to four gate driving circuits 311 of a group of gate driving circuits 300 in a certain order. According to the structure of the pixel circuit 100, the structure and the control timing of X gate driving circuits 310 included in each group of gate driving circuits 300 may be different, which is not specifically limited in the embodiments of the present disclosure.

It can be understood that the N selection control signal terminals MUX may sequentially output selection control signals in any order, or a part of the N selection control signal terminals MUX may simultaneously output a plurality of selection control signals, which is not specifically limited in the embodiments of the present disclosure.

In some embodiments, the multiplex circuit 500 includes N turn-off signal control sub-circuits 502. Referring to FIG. 22, the driving method further includes the followings.

In a case where at least one of the N selection control signal terminals MUX outputs the selection control signal, the first clock signal terminal MUXc outputs no signal (or outputs a turn-off voltage signal to cause the second transistors T20 to be in a turn-off state). In a case where all the N selection control signal terminals MUX output no selection control signal, the first clock signal terminal MUXc outputs the first clock signal. In this way, when any start signal control sub-circuit 501 of any multiplex circuit 500 outputs an operating voltage signal, a turn-off signal control sub-circuit 502 sharing one signal output node Out with the start signal control sub-circuit 501 is in an off state, which prevents the turn-off signal control sub-circuit 502 from affecting the start signal output by the start signal control sub-circuit 501.

In some embodiments, the display substrate 1100 includes a second multiplex circuit 520, and each signal output node Out of the second multiplex circuit 520, which is connected to a first gate driving circuit 311, is further electrically connected to a reset signal receiving terminal STD1 of a last-stage first shift register unit 3111 of the first gate driving circuit 311. Referring to FIG. 22, the driving method further includes the followings.

After a last-stage first shift register unit 3111 of each gate driving circuit 310 outputs a first scan signal, the signal output node Out electrically connected to the gate driving circuit 310 in the second multiplex circuit 520 outputs an initialization signal. In this way, the last-stage first shift register unit 3111 of the first gate driving circuit 311 may be reset by the initialization signal output from the signal output node Out. There is no need to provide a redundant first shift register unit next to the last stage first shift register unit 3111 for resetting the last-stage first shift register unit 3111. Thus, the structure of the first gate driving circuit 310 is simplified.

The foregoing descriptions are merely specific implementation manners of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A display substrate, having a display region, the display region including N display zones, N being greater than or equal to 2;

the display substrate comprising:

a plurality of pixel circuits arranged in rows, each display zone being provided therein with a plurality of rows of pixel circuits;

N groups of gate driving circuits respectively corresponding to the N display zones, wherein each group of gate driving circuits includes X gate driving circuits, X being greater than or equal to 2, each gate driving circuit of the X gate driving circuits is electrically connected to a plurality of rows of pixel circuits in a corresponding display zone; the X gate driving circuits are configured to output X scan signals of different functions to a plurality of rows of pixel circuits connected thereto; and at least one multiplex circuit, wherein each multiplex circuit is electrically connected to N gate driving circuits, which are configured to output scan signals of a same function, of the N groups of gate driving circuits, and is further electrically connected to N selection control signal terminals and a start signal terminal; and the multiplex circuit is configured to, under control of at least one selection control signal from at least one selection control signal terminal of the N selection control signal terminals, select at least one of the N gate driving circuits connected thereto, and transmit a start signal from the start signal terminal to the selected at least one gate driving circuit.

2. The display substrate according to claim 1, wherein the multiplex circuit includes:

N start signal control sub-circuits, wherein each start signal control sub-circuit is electrically connected to the start signal terminal, a single selection control signal terminal of the N selection control signal terminals, and a single gate driving circuit of the N gate driving circuits; and the start signal control sub-circuit is configured to transmit the start signal to the single gate driving circuit under control of a selection control signal from the signal selection control signal terminal;

wherein among the N start signal control sub-circuits, different start signal control sub-circuits are electrically connected to different selection control signal terminals, and gate driving circuits, which are configured to output scan signals of a same function, of different groups of gate driving circuits.

3. The display substrate according to claim 2, wherein the multiplex circuit further includes:

N turn-off signal control sub-circuits, wherein each turn-off signal control sub-circuit is electrically connected to a first clock signal terminal, a first voltage signal terminal and one of the N gate driving circuits; the turn-off signal control sub-circuit is configured to transmit a first voltage signal from the first voltage signal terminal to the one of the N gate driving circuits under control of a first clock signal from the first clock signal terminal;

wherein the N turn-off signal control sub-circuits are electrically connected to a same first clock signal terminal, and different turn-off signal control sub-circuits are electrically connected to gate driving circuits, which are configured to output scan signals of a same function, of different groups of gate driving circuits.

4. The display substrate according to claim 3, wherein the multiplex circuit further includes:

N storage sub-circuits, wherein each storage sub-circuit is electrically connected to the first voltage signal terminal and a signal output node, and is configured to maintain a voltage of the signal output node; the signal output node is a common node to which a corresponding start signal control sub-circuit, a corresponding turn-off signal control sub-circuit and a corresponding gate driving circuit are connected;

wherein among the N storage sub-circuits, different storage sub-circuits are electrically connected to different signal output nodes.

5. The display substrate according to claim 4, wherein the start signal control sub-circuit includes a first transistor, a control electrode of the first transistor is electrically connected to the single selection control signal terminal, a first electrode of the first transistor is electrically connected to the start signal terminal, and a second electrode of the first transistor is electrically connected to the single gate driving circuit;

the turn-off signal control sub-circuit includes a second transistor, a control electrode of the second transistor is electrically connected to the first clock signal terminal, a first electrode of the second transistor is electrically connected to the first voltage signal terminal, and a second electrode of the second transistor is electrically connected to the one of the N gate driving circuits;

the storage sub-circuit includes a first capacitor, a first electrode plate of the first capacitor is electrically connected to the first voltage signal terminal, and a second electrode plate of the first capacitor is electrically connected to the signal output node.

6. The display substrate according to claim 1, wherein the display substrate comprises X multiplex circuits, and the X multiplex circuits are respectively electrically connected to X start signal terminals, and are respectively electrically connected to the X gate driving circuits of each group of gate driving circuits.

7. The display substrate according to claim 6, further comprising:

a plurality of pins configured to electrically connected to a timing control chip;

N selection control signal lines, wherein each selection control signal line is electrically connected to one pin and the X multiplex circuits, and each selection control signal line is used as one of the N selection control signal terminals;

X start signal connection lines, wherein each start signal connection line is electrically connected to one pin and one multiplex circuit, and each start signal connection line is used as one of the X start signal terminals;

wherein the multiplex circuit includes N start signal control sub-circuits, X start signal control sub-circuits, which are electrically connected to a same selection control signal line, of the X multiplex circuits are electrically connected to X gate driving circuits of a same group of gate driving circuits, and different start signal control sub-circuits of the X multiples circuits are electrically connected to different gate driving circuits.

8. The display substrate according to claim 7, further comprising:

a first clock signal line electrically connected to one pin and the X multiplex circuits, the first clock signal line being used as a first clock signal terminal;

wherein the multiplex circuit includes N turn-off signal control sub-circuits, and the first clock signal line is electrically connected to N turn-off signal control sub-circuits of each of the X multiplex circuits.

9. The display substrate according to claim 1, further comprising:

a plurality of first scan signal lines, wherein each first scan signal line is electrically connected to a row of pixel circuits; wherein each pixel circuit includes a data writing transistor; the data writing transistor is electrically connected to a first scan signal line, and is configured to write grayscale data into the pixel circuit under control of a first scan signal from the first scan signal line;

the X gate driving circuits include a first gate driving circuit, and the first gate driving circuit is configured to output first scan signals to first scan signal lines of the plurality of first scan signal lines;

the at least one multiplex circuit includes a first multiplex circuit, and the first multiplex circuit is electrically connected to a first start signal terminal, the N selection control signal terminals, and N first gate driving circuits of the N groups of gate driving circuits;

the first multiplex circuit is configured to, under control of the at least one selection control signal of the at least one selection control signal terminal of the N selection control signal terminals, select at least one first gate driving circuit of the N first gate driving circuits, and transmit a first start signal from the first start signal terminal to the selected at least one first gate driving circuit.

10. The display substrate according to claim 9, wherein the display substrate comprises a plurality of multiplex circuits, and the plurality of multiplex circuits include:

a second multiplex circuit electrically connected to an initialization signal terminal, the N selection control signal terminals, and the N first gate driving circuits of the N groups of gate driving circuits; the second multiplex circuit is configured to, under control of the at least one selection control signal of the at least one selection control signal terminal of the N selection control signal terminals, select the at least one first gate driving circuit of the N first gate driving circuits, and transmit an initialization signal from the initialization signal terminal to the selected at least one first gate driving circuit;

wherein the first gate driving circuit includes a plurality of first shift register units that are sequentially connected in cascade; the second multiplex circuit is electrically connected to each first shift register unit of each first gate driving circuit; and the first shift register unit is configured to initialize a circuit node of the first shift register unit under control of the initialization signal from the second multiplex circuit.

11. The display substrate according to claim 10, wherein the first shift register unit includes a cascade signal output node and a reset signal receiving terminal; for two first shift register units that are connected in cascade, a cascade signal output node of a previous-stage first shift register unit is electrically connected to a first start signal receiving terminal of a current-stage first shift register unit, and a cascade signal output node of the current-stage first shift register unit is electrically connected to a reset signal receiving terminal of the previous-stage first shift register unit;

a signal output node, which is connected to each first gate driving circuit, of the second multiplex circuit is further electrically connected to a reset signal receiving terminal of a last-stage first shift register unit of each first gate driving circuit;

wherein the first multiplex circuit is configured to transmit the first start signal to a first gate driving circuit of a target group of gate driving circuits under control of a selection control signal from a same selection control signal terminal, and the second multiplex sub-circuit is configured to transmit the initialization signal to a first gate driving circuit of a previous group of gate driving circuits under control of the selection control signal from the same selection control signal terminal; in a scan direction of the display region, the target group of gate driving circuits is a group of gate driving circuits adjacent to the previous group of gate driving circuits; and in a case where the target group of gate driving circuits is a first group of gate driving circuits, the previous group of gate driving circuits is a last group of gate driving circuits.

12. The display substrate according to claim 1, further comprising:

a plurality of second scan signal lines, a single second scan signal line being electrically connected to a row of pixel circuits, wherein each pixel circuit includes a first initialization transistor; the first initialization transistor is electrically connected to a second scan signal line, and is configured to initialize a voltage of a first node of the pixel circuit under control of a second scan signal from the second scan signal line;

the X gate driving circuits include a second gate driving circuit, and the second gate driving circuit is configured to output second scan signals to second scan signal lines of the plurality of second scan signal lines;

wherein the display substrate comprises a plurality of multiplex circuits, and the plurality of multiplex circuits include a third multiplex circuit; the third multiplex circuit is electrically connected to a second start signal terminal, the N selection control signal terminals, and N second gate driving circuits of the N groups of gate driving circuits; the third multiplex circuit is configured to, under control of the at least one selection control signal from the at least one of the N selection control signal terminals, select at least one second gate driving circuit of the N second gate driving circuits, and transmit a second start signal from the second start signal terminal to the selected at least one second gate driving circuit.

13. The display substrate according to claim 1, further comprising:

a plurality of third scan signal lines, a single third scan signal line being electrically connected to a row of pixel circuits, wherein each pixel circuit includes a second initialization transistor; the second initialization transistor is electrically connected to a third scan signal line of the plurality of third scan signal lines, and is configured to reset a voltage of a second node of the pixel circuit under control of a third scan signal from the third scan signal line;

the X gate driving circuits include a third gate driving circuit, and the third gate driving circuit is configured to output third scan signals to third scan signal lines of the plurality of third scan signal lines;

wherein the display substrate comprises a plurality of multiplex circuits, and the plurality of multiplex circuits include a fourth multiplex circuit; the fourth multiplex circuit is electrically connected to a third start signal terminal, the N selection control signal terminals, and N third gate driving circuits of the N groups of gate driving circuits; the fourth multiplex circuit is configured to, under control of the at least one selection control signal from the at least one of the N selection control signal terminals, select at least one third gate driving circuit of the N third gate driving circuits, and transmit a third start signal from the third start signal terminal to the selected at least one third gate driving circuit.

14. The display substrate according to claim 1, further comprising a plurality of fourth scan signal lines, a single fourth scan signal line being electrically connected to a row of pixel circuits, wherein each pixel circuit includes a light-emitting control transistor; the light-emitting control transistor is electrically connected to a fourth scan signal line, and is configured to turn on the pixel circuit under control of a fourth scan signal from the fourth scan signal line;

the X gate driving circuits include a light-emitting control circuit, and the light-emitting control circuit is configured to output fourth scan signals to fourth scan signal lines of the plurality of fourth scan signal lines;

wherein the display substrate comprises a plurality of multiplex circuits, and the plurality of multiplex circuits include a fifth multiplex circuit; the fifth multiplex circuit is electrically connected to a fourth start signal terminal, the N selection control signal terminals, and N light-emitting control circuits of the N groups of gate driving circuits; the fifth multiplex circuit is configured to, under control of the at least one selection control signal from the at least one of the N selection control signal terminals, select at least one light-emitting control circuit of the N light-emitting control circuits, and transmit a fourth start signal from the fourth start signal terminal to the selected at least one light-emitting control circuit.

15. The display substrate according to claim 1, further having a peripheral region surrounding the display region, wherein the peripheral region includes a bonding region located on a side of the display region in a scan direction of the display region;

the multiplex circuit is disposed on a side, proximate to the bonding region, of the N groups of gate driving circuits.

16. A driving method of a display substrate, configured to drive the display substrate according to claim 1, the driving method comprising:

the at least one selection control signal terminal of the N selection control signal terminals outputting the at least one selection control signal; and under the at least one selection control signal, the multiplex circuit selecting the at least one gate driving circuit of the N gate driving circuits connected thereto, and transmitting the start signal from the start signal terminal to the selected at least one gate driving circuit.

17. The driving method according to claim 16, wherein the multiplex circuit includes N turn-off signal control sub-circuits, and the driving method further comprises:

in a case where the at least one selection control signal terminal of the N selection control signal terminals outputs the selection control signal, a first clock signal terminal outputting no signal; and in a case where all the N selection control signal terminals output no selection control signal, the first clock signal terminal outputting a first clock signal.

18. The driving method according to claim 17, wherein the display substrate includes a second multiplex circuit, each signal output node of the second multiplex circuit, which is connected to a first gate driving circuit, is further electrically connected to a reset signal receiving terminal of a last-stage first shift register unit of the first gate driving circuit, and the driving method further comprises:

after a last-stage first shift register unit of each gate driving circuit outputs a first scan signal, a signal output node, electrically connected to the gate driving circuit, of the second multiplex circuit outputting an initialization signal.

19. A display device, comprising the display substrate according to claim 1.

20. The display device according to claim 19, wherein the multiplex circuit includes:

N start signal control sub-circuits, wherein each start signal control sub-circuit is electrically connected to the start signal terminal, a single selection control signal terminal of the N selection control signal terminals, and a single gate driving circuit of the N gate driving circuits; and the start signal control sub-circuit is configured to transmit the start signal to the single gate driving circuit under control of a selection control signal from the signal selection control signal terminal;

wherein among the N start signal control sub-circuits, different start signal control sub-circuits are electrically connected to different selection control signal terminals, and gate driving circuits, which are configured to output scan signals of a same function, of different groups of gate driving circuits.

* * * * *